United States Patent (10) Patent No.: US 11,637,980 B2
Shim et al. (45) Date of Patent: Apr. 25, 2023

(54) IMAGE SENSOR INCLUDING DRAM CAPACITOR AND OPERATING METHOD THEREOF

(71) Applicant: SAMSUNG ELECTRONICS CO., LTD., Suwon-si (KR)

(72) Inventors: Eunsub Shim, Hwaseong-si (KR); Jungchak Ahn, Yongin-si (KR); Kyungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/647,515

(22) Filed: Jan. 10, 2022

(65) Prior Publication Data

US 2022/0337777 A1 Oct. 20, 2022

(30) Foreign Application Priority Data

Apr. 15, 2021 (KR) .................. 10-2021-0049151

(51) Int. Cl.
*H04N 5/3745* (2011.01)
*H04N 5/355* (2011.01)
*H04N 5/378* (2011.01)

(52) U.S. Cl.
CPC ....... *H04N 5/37452* (2013.01); *H04N 5/3559* (2013.01); *H04N 5/378* (2013.01)

(58) Field of Classification Search
CPC .. H04N 5/37452; H04N 5/3559; H04N 5/378; H04N 5/3741; H01L 27/14609; H01L 27/14636
See application file for complete search history.

(56) References Cited

U.S. PATENT DOCUMENTS

| 7,598,481 | B2 | 10/2009 | Hwang et al. |
| 9,888,191 | B2 * | 2/2018 | Beck ...................... H04N 5/243 |
| 9,986,186 | B2 | 5/2018 | Machida et al. |
| 10,103,193 | B1 * | 10/2018 | Manabe ............ H01L 27/14614 |
| 10,110,783 | B2 | 10/2018 | Webster |
| 10,218,924 | B2 | 2/2019 | Manabe et al. |
| 10,455,162 | B2 | 10/2019 | Singh et al. |

(Continued)

FOREIGN PATENT DOCUMENTS

| JP | 2006262387 | 9/2006 |
| WO | 2020261817 | 12/2020 |

*Primary Examiner* — Nhan T Tran
(74) *Attorney, Agent, or Firm* — F. Chau & Associates, LLC

(57) ABSTRACT

An image sensor includes a pixel array having a plurality of pixels; a row driver providing the pixel array with a boosting signal; and a read-out circuit configured to read out pixel signals output from pixels of a row line selected by the row driver. Each of the plurality of pixels includes: a first photodiode; a transmission transistor connected to the first photodiode; a first floating diffusion node, a second floating diffusion node, and a third floating diffusion node, which are connected to the transmission transistor to accumulate charges generated by the first photodiode; an LCG capacitor connected to the third floating diffusion node to accumulate the charges generated by the first photodiode; an MCG transistor connected between the first floating diffusion node and the second floating diffusion node; and an LCG transistor connected to the third floating diffusion node.

20 Claims, 19 Drawing Sheets

(56) References Cited

U.S. PATENT DOCUMENTS

2009/0045319 A1\* 2/2009 Sugawa ............. H04N 5/37452
                                                    250/208.1
2020/0329206 A1\* 10/2020 Shim .................. H04N 5/37457
2022/0329745 A1\* 10/2022 Ha ...................... H04N 5/37455

\* cited by examiner

IMAGE SENSOR INCLUDING DRAM CAPACITOR AND OPERATING METHOD THEREOF

CROSS-REFERENCE TO RELATED APPLICATION

This application claims priority under 35 U.S.C. § 119 to Korean Patent Application No. 10-2021-0049151, filed on Apr. 15, 2021, in the Korean Intellectual Property Office, the disclosure of which is incorporated by reference herein in its entirety.

FIELD

The present disclosure relates to an image sensor and an operating method of the image sensor, and more particularly, to an image sensor that generates image data by using a dynamic random-access memory (DRAM) capacitor connected to a floating diffusion node and an operating method of the image sensor.

DISCUSSION OF RELATED ART

An image sensor may capture a two-dimensional image or a three-dimensional image of an object. Such an image sensor generates the image of the object by using a photoelectric conversion element that responds to intensity of light reflected from the object. Complementary metal-oxide semiconductor (CMOS) technology has advanced, and CMOS image sensors have been widely used.

SUMMARY

A dynamic random-access memory (DRAM) capacitor may be added to a floating diffusion (FD) node of an image sensor. The present disclosure provides an image sensor embodiment, including a DRAM capacitor connected to a floating diffusion node, that generates image data with a wide dynamic range and an increased signal-to-noise ratio.

According to an embodiment, an image sensor may include a pixel array including a plurality of pixels, and a row driver connected to the pixel array, wherein each of the plurality of pixels may include a first photodiode, a transmission transistor connected to the first photodiode, a first floating diffusion node, a second floating diffusion node, and a third floating diffusion node, which are connected to the transmission transistor to accumulate charges generated by the first photodiode, an LCG capacitor connected to the third floating diffusion node to accumulate the charges generated by the first photodiode, an MCG transistor connected between the first floating diffusion node and the second floating diffusion node, and an LCG transistor connected to the third floating diffusion node.

According to an embodiment, a pixel may include photodiodes, a first floating diffusion node configured to accumulate charges generated by any one of the photodiodes, transmission transistors, each having one end connected to one of the photodiodes and having another end connected to the first floating diffusion node, an MCG transistor connected to the first floating diffusion node, a second floating diffusion node connected to the MCG transistor, an LCG transistor connected to one of the first floating diffusion node and a second floating diffusion node, a third floating diffusion node connected to the LCG transistor, and a dynamic random-access memory (DRAM) capacitor having one end connected to the third floating diffusion node and having another end to which a boosting voltage is applied.

According to an embodiment, an operating method of an image sensor including a plurality of pixels that each include a photodiode, a transmission transistor for transmitting charges generated by the photodiode, first to third floating diffusion nodes in which the charges generated by the photodiode are accumulated through the transmission transistor, and a dynamic random-access memory (DRAM) capacitor, may include accumulating overflow charges generated by the photodiode in the first to third floating diffusion nodes and the DRAM capacitor in a state in which the transmission transistor is turned off, outputting an overflow image signal corresponding to the overflow charges, resetting the first to third floating diffusion nodes and the DRAM capacitor and outputting first to third reset signals respectively corresponding to a plurality of conversion gain modes, and outputting first to third image signals respectively corresponding to the plurality of conversion gain modes from the first to third floating diffusion nodes and the DRAM capacitor after the transmission transistor is turned on.

BRIEF DESCRIPTION OF THE DRAWINGS

Embodiments of the present disclosure may be more clearly understood from the following detailed description taken in conjunction with the accompanying drawings, in which.

DETAILED DESCRIPTION OF EMBODIMENTS

Figure 1:
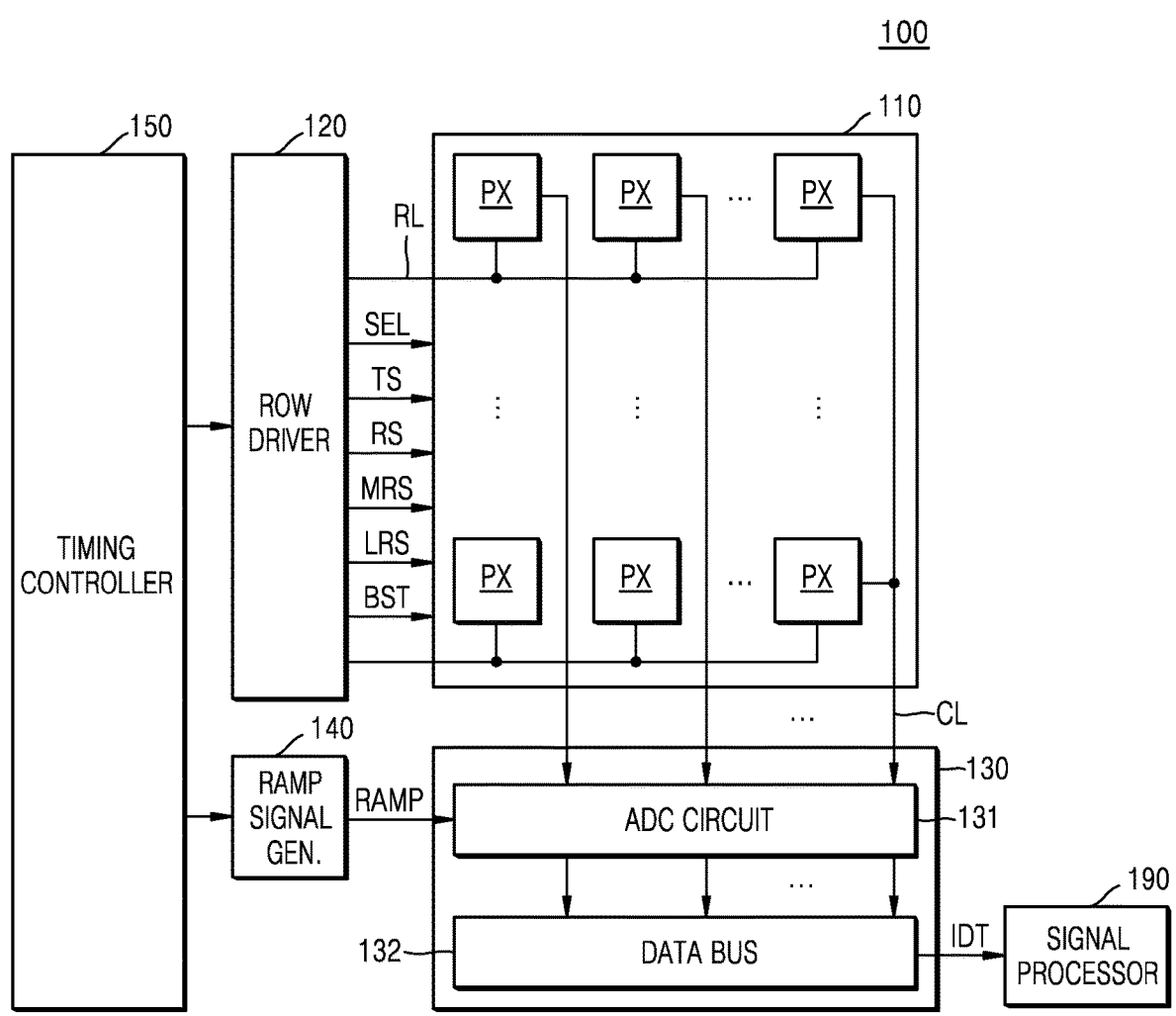
FIG. 1 is a block diagram illustrating an image sensor according to an embodiment of the present disclosure.

FIG. 1 illustrates an image sensor according to an embodiment of the present disclosure.

An image sensor 100 may be mounted in an electronic device having an image or a light sensing function. For example, the image sensor 100 may be mounted in electronic device such as a camera, a smart phone, a wearable device, an Internet of Things (IoT) device, a home appliance, a tablet personal computer (PC), a personal digital assistant (PDA), a portable multimedia player (PMP), a navigation system, a drone, or an advanced driver assistance system (ADAS). In addition, the image sensor 100 may be mounted in an electronic device provided as a component in a vehicle, furniture, manufacturing equipment, a door, various measurement devices, and so on.

Referring to FIG. 1, the image sensor 100 may include a pixel array 110, a row driver 120, a readout circuit 130, a ramp signal generator 140, a timing controller 150, and a signal processor 190, and the readout circuit 130 may include an analog-to-digital conversion circuit 131 (hereinafter referred to as an ADC circuit) and a data bus 132.

The pixel array 110 may include a plurality of row lines RL, a plurality of column lines CL, and a plurality of pixels PXs that are connected to the plurality of row lines RL and the plurality of column lines CL and are arranged in a matrix. The plurality of pixels PX may be provided as an active pixel sensor (APS).

Each of the plurality of pixels PX may include at least one photoelectric conversion element. Each of the plurality of pixels PX may detect light by using the photoelectric conversion element and output an image signal that is an electrical signal according to the detected light. For example, the photoelectric conversion element may include a light detecting element composed of an organic material or an inorganic material, such as an inorganic photodiode, an organic photodiode, a perovskite photodiode, a phototransistor, a photogate, or a pinned photodiode. In an embodiment, each of the plurality of pixels PX may include a plurality of photoelectric conversion elements.

A micro lens for light collection may be arranged over each of the plurality of pixels PX or each pixel group including adjacent pixels PX. Each of the plurality of pixels PX may detect light in a certain spectral region from light received through the micro lens. For example, the pixel array 110 may include a red pixel for converting light in a red spectral region into an electrical signal, a green pixel for converting light in a green spectral region into an electrical signal, and a blue pixel for converting light in a blue spectral region into an electrical signal. A color filter for transmitting light in a certain spectral region therethrough may be arranged on each of the plurality of pixels PX. However, the present disclosure is not limited thereto, and the pixel array 110 may include pixels for converting light in spectral regions other than red, green, and blue into electrical signals.

In an embodiment, each of the plurality of pixels PX may have a multi-layer structure. Each of the plurality of pixels PX of a multi-layer structure includes a plurality of stacked photoelectric conversion elements that convert light in different spectral regions into electric signals, and electric signals corresponding to different colors may be generated from the plurality of photoelectric conversion elements. In other words, electrical signals corresponding to a plurality of colors may be output from one pixel PX.

A color filter array for transmitting light in a certain spectral region may be arranged over the plurality of pixels PX, and a color capable of being detected by a corresponding pixel may be determined by the color filter arranged over each of the plurality of pixels PX. However, the present disclosure is not limited thereto, and in an embodiment, a certain photoelectric conversion element may also convert light in a certain wavelength band into an electrical signal according to a level of an electrical signal applied to the photoelectric conversion element.

In each of the plurality of pixels PX, charges generated by a photoelectric conversion element such as a photodiode may be accumulated in a floating diffusion node, and the charges accumulated in the floating diffusion node may be converted into a voltage. In this case, a rate at which the charges accumulated in the floating diffusion node are converted into a voltage may be referred to as a conversion gain. The conversion gain may vary according to capacitance of the floating diffusion node.

When the capacitance of the floating diffusion node increases, the conversion gain may be reduced, and when the capacitance of the floating diffusion node is reduced, the conversion gain may increase. In some embodiments, each of the plurality of pixels PX may operate in a plurality of conversion gain modes, for example, a triple conversion gain mode. The triple conversion gain mode may include a low conversion gain mode, a middle conversion gain mode, and a high conversion gain mode. "Operating in a triple conversion gain mode" may mean operating while continuously changing from the low conversion gain mode to the middle conversion gain mode and from the middle conversion gain mode to the high conversion gain mode, and mean operating while continuously changing from the high conversion gain mode to the middle conversion gain mode and from the middle conversion gain mode to the low conversion gain mode.

A rate at which charges are converted into a voltage may be highest in the high conversion gain mode and lowest in the low conversion gain mode. Accordingly, an operation of generating a pixel signal corresponding to illuminance lower than illuminance in the middle conversion gain mode and the low conversion gain mode may be performed in the high conversion gain mode. an operation of generating a pixel signal corresponding to illuminance lower than illuminance in the low conversion gain mode may be performed in the middle conversion gain mode.

In some embodiments, a photodiode may generate pixel signals in the triple conversion gain mode described above. Specifically, the photodiode may operate in the high conversion gain mode to generate a first pixel signal corresponding to a first illuminance period that is the lowest illuminance period. Alternatively, the photodiode may operate in the middle conversion gain mode to generate a second pixel signal corresponding to a second illuminance period that is a higher illuminance period than the first illuminance period. Alternatively, the photodiode may operate in the low conversion gain mode to generate a third pixel signal corresponding to a third illuminance period that is a higher illuminance period than the second illuminance period. The first to third pixel signals generated in the triple conversion gain mode may be synthesized into one image. Accordingly, the synthesized image may have a high dynamic range, and a motion artifact may be removed therefrom.

In some embodiments, each of the plurality of pixels PX may operate in a single exposure method in which one exposure is performed or a multiple exposure method in which multiple exposures are performed. For example, the pixel PX may operate in a single exposure method in which pixel signals are generated by a photodiode after one exposure operation. In another example, the pixel PX may operate with a multiple exposure method in which a pixel signal is generated by a photodiode during a first exposure operation and then a pixel signal is additionally generated by a photodiode during a second exposure operation.

The timing controller 150 may control timing of the row driver 120, the readout circuit 130, and the ramp signal generator 140. The timing controller 150 may provide control signals for controlling operation timing to the row driver 120, the readout circuit 130, and the ramp signal generator 140.

The row driver 120 may drive the pixel array 110 in units of row lines RL. The row driver 120 may select at least one row line RL from among the row lines RL included in the pixel array 110. For example, the row driver 120 may generate a selection signal SEL for selecting one of the row lines RL. The pixel array 110 may output a pixel signal to the row line RL selected by the selection signal SEL. The pixel signal may include a reset signal and an image signal.

The row driver 120 may generate control signals for controlling the pixel array 110. For example, the row driver 120 may generate a transmission control signal TS for controlling a transmission transistor of the pixel PX, a reset control signal RS for controlling a reset transistor, a middle conversion gain (MCG) control signal MRS for controlling an MCG transistor, a low conversion gain (LCG) control signal LRS for controlling an LCG transistor, a boosting signal BST for boosting a floating diffusion node, and so on. The row driver 120 may provide control signals to the plurality of pixels PX in response to a timing control signal provided by the timing controller 150. The row driver 140 may determine activation timing and deactivation timing of the control signals based on various operation modes (for example, high conversion gain mode). A detailed control of each of the plurality of pixels PX will be described below with reference to FIGS. 2 and 4.

The ramp signal generator 140 may generate a ramp signal RAMP that increases or decreases with a certain slope and provide the ramp signal RAMP to the ADC circuit 131 of the readout circuit 130.

The readout circuit 130 may read out a pixel signal from the pixels PX of the row line RL selected by the row driver 120 among the plurality of pixels PX. The readout circuit 130 may convert the pixel signals received from the pixel array 110 through a plurality of column lines CL into digital data based on the ramp signal RAMP provided by the ramp signal generator 140, and generate and output pixel values corresponding to the plurality of pixels PX in units of rows.

The ADC circuit 131 may compare a pixel signal received through each of the plurality of column lines CL with the ramp signal RAMP and generate a pixel value that is a digital signal based on the comparison results. For example, the ADC circuit 131 may remove a reset signal from an image signal and generate a pixel value indicating the amount of light detected by the pixel PX. The ADC circuit 131 may sample and hold a pixel signal according to a Correlated Double Sampling (CDS) method and double-sample a level of a certain noise (for example, the reset signal) and a level of the image signal and generate a comparison signal based on a level corresponding to a difference between the two levels. The ADC circuit 131 may also read out the image signal first and then reading out the reset signal to sample the provided pixel signal by using a delta reset sampling (DRS) method.

A plurality of pixel values generated by the ADC circuit 131 may be output as image data IDT through the data bus 132. The image data IDT may be provided to an image signal processor inside or outside the image sensor 100.

The data bus 132 may temporarily store the pixel value output from the ADC circuit 131 and then output the pixel value. The data bus 132 may include a plurality of column memories and a column decoder. The plurality of pixel values stored in the plurality of column memories may be output as the image data IDT under the control of the column decoder.

In some embodiments, the image sensor 100 may further include a bias current controller to increase or decrease a bias current when an operation mode of the pixel PX is changed during a readout period (for example, when the high conversion gain mode is changed to the middle conversion gain mode). For example, the bias current at the time when the pixel PX operates in the high conversion gain mode may be less than the bias current at the time when the pixel PX operates in the middle conversion gain mode. A plurality of bias current controllers may be respectively connected to the plurality of column lines CL.

The signal processing unit 190 may perform noise reduction processing, gain adjustment, waveform shaping processing, interpolation processing, white balance processing, gamma processing, edge enhancement processing, binning, and so on for the image data. In some embodiments, the signal processing unit 190 may generate an image having a high dynamic range by synthesizing image data output by the pixel array 110 operating in the triple conversion gain mode. In an embodiment, the signal processing unit 190 may be included in a processor outside the image sensor 100.

Figure 2:
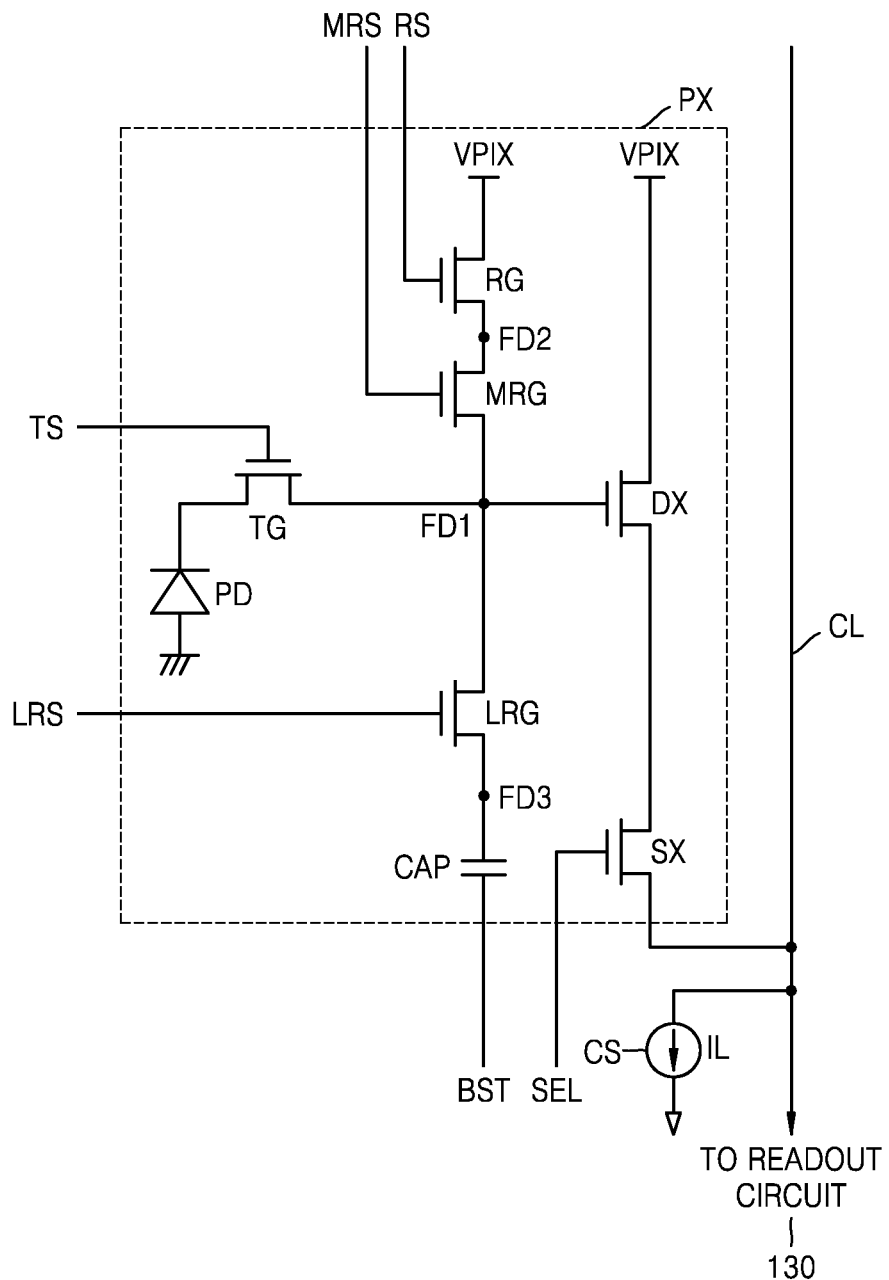
FIG. 2 is a circuit diagram of a pixel according to an embodiment of the present disclosure.

FIG. 2 illustrates a pixel according to an embodiment of the present disclosure. In detail, FIG. 2 is a circuit diagram of one pixel PX of the plurality of pixels PX of FIG. 1 according to an embodiment of the present disclosure.

Referring to FIGS. 1 and 2, the pixel PX may include a photodiode PD. The pixel PX includes a plurality of transistors such as a transmission transistor TG, an MCG transistor MRG, an LCG transistor LRG, a reset transistor RG, a drive transistor DX, a selection transistor SX, and an LCG capacitor CAP. Control signals TS, MRS, LRS, RS, BST, and SEL may be applied to the pixel PX, and at least some of the control signals may be generated by the row driver 120.

The photodiode PD may generate photo-charges that vary according to the intensity of light. For example, the photodiode PD may generate charges, that is, negatively charged electrons and positively charged holes, in proportion to the amount of incident light. The photo-charges generated by the photodiode PD may also be transmitted to only a first floating diffusion node FD1 to be accumulated therein or may also be transmitted to the first floating diffusion node FD1 and a second floating diffusion node FD2 to be accumulated therein. Alternatively, the photo-charges may be transmitted to the first floating diffusion node FD1 to a third floating diffusion node FD3 and the LCG capacitor CAP to be accumulated therein. A parasitic capacitor may be formed in each of the first floating diffusion node FD1 to the third floating diffusion node FD3, or an actual capacitor may be connected thereto.

The pixel PX may include a transmission transistor TG. One end of the transmission transistor TG may be connected to the photodiode PD, and the other end thereof may be connected to the first floating diffusion node FD1. The transmission transistor TG may be turned on or off in response to a transmission control signal TS received from the row driver 120. Accordingly, the transmission transistor TG may transmit photo-charges generated by the photodiode PD to the first floating diffusion node FD1.

The pixel PX may include the MCG transistor MRG. One end of the MCG transistor MRG may be connected to the first floating diffusion node FD1, and the other end thereof may be connected to the second floating diffusion node FD2. The MCG transistor MRG may be turned on or off in response to an MCG signal MRS received from the row driver 120. Accordingly, the MCG transistor MRG may connect the first floating diffusion node FD1 to the second floating diffusion node FD2. As the first floating diffusion node FD1 is connected to the second floating diffusion node FD2, capacitance may increase and a conversion gain may be reduced. Accordingly, the pixel PX may operate in the middle conversion gain mode.

The pixel PX may include the LCG transistor LRG. One end of the LCG transistor LRG may be connected to the first floating diffusion node FD1, and the other end thereof may be connected to the third floating diffusion node FD3. The LCG transistor LRG may be turned on or off in response to an LCG signal LRS received from the row driver 120. Accordingly, the LCG transistor LRG may connect the first floating diffusion node FD1 to the third floating diffusion node FD3. As the first floating diffusion node FD1 is connected to the third floating diffusion node FD3, capacitance may increase and a conversion gain may be reduced. When both the LCG transistor LRG and the MCG transistor MRG are turned on, the first floating diffusion node FD1 to the third floating diffusion node FD3 may be connected to each other. Accordingly, the pixel PX may operate in the low conversion gain mode.

That is, both the LCG transistor LRG and the MCG transistor MRG may operate in the high conversion gain mode when turned off, and both the LCG transistor LRG and the MCG transistor MRG may operate in the middle conversion gain mode because capacitance increases when the MCG transistor MRG is turned on and the LCG transistor LRG is turned off, and both the LCG transistor LRG and the MCG transistor MRG may operate in the low conversion gain mode when turned on.

The pixel PX may include the LCG capacitor CAP. One end of the LCG capacitor CAP may be connected to the third floating diffusion node FD3, and a boosting signal BST from the row driver 120 may be applied to the other end of the LCG capacitor CAP. In another embodiment, one end of the LCG capacitor CAP may be connected to the third floating diffusion node FD3, and a ground voltage may be applied to the other end of the LCG capacitor CAP.

According to an embodiment of the present disclosure, charges from the photodiode PD may overflow due to an exposure operation, and the overflowed charges may be accumulated in the LCG capacitor CAP. The LCG capacitor CAP may include a dynamic random-access memory (DRAM) capacitor. The LCG capacitor CAP will be described in detail below with reference to FIG. 3.

The pixel PX may include the reset transistor RG. The reset transistor RG may reset charges accumulated in at least one of the first floating diffusion node FD1 to the third floating diffusion node FD3. A pixel voltage VPIX may be applied to one end of the reset transistor RG, and the other end thereof may be connected to the second floating diffusion node FD2. In another embodiment, a voltage other than the pixel voltage VPIX may be applied to one end of the reset transistor RG. The reset transistor RG may be turned on or off in response to a reset control signal RS received from the row driver 120. Accordingly, charges accumulated in at least one of the first floating diffusion node FD1 to the third floating diffusion node FD3 may be discharged to reset at least one of the first floating diffusion node FD1 to the third floating diffusion node FD3.

The pixel PX may include a drive transistor DX. One end of the drive transistor DX may be connected to the selection transistor SX, and the pixel voltage VPIX may be applied to the other end of the drive transistor DX. The drive transistor DX may operate as a source follower based on a bias current IL generated by a current source CS connected to the column line CL. The drive transistor DX may output a voltage corresponding to charges accumulated in at least one of the first floating diffusion node FD1 to the third floating diffusion node FD3 as a pixel signal.

The pixel PX may include the selection transistor SX. One end of the selection transistor SX may be connected to the drive transistor DX, and the other end thereof may be connected to the column line CL. The selection transistor SX may be turned on or off in response to a selection signal SEL received from the row driver 120. When the selection transistor SX is turned on during a readout operation, a reset signal corresponding to a reset operation or a pixel signal including an image signal corresponding to a charge accumulation operation may be output to the column line CL.

According to the present disclosure, charges generated by the photodiode PD may be accumulated in the first floating diffusion nodes FD1 to the third floating diffusion node FD3 and the LCG capacitor CAP, an image sensor may generate image data having a wide dynamic range and an improved signal-to-noise ratio.

Figure 3:
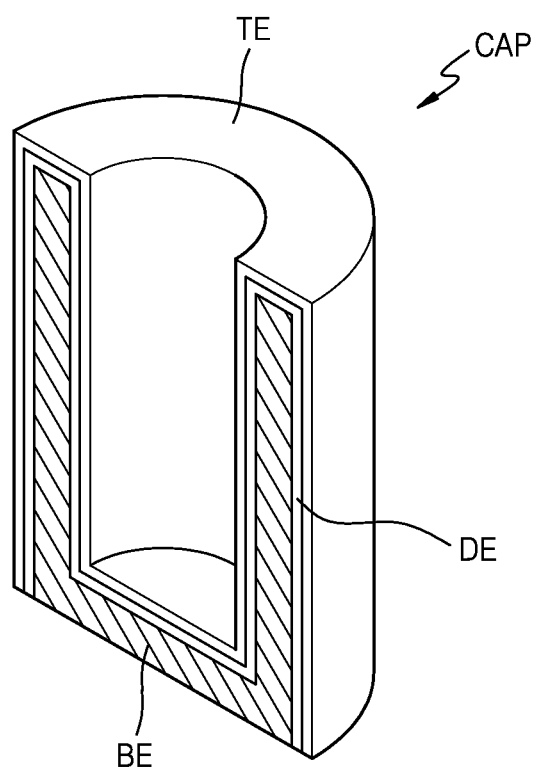
FIG. 3 is a cross-sectional diagram illustrating a capacitor according to an embodiment of the present disclosure.

FIG. 3 illustrates a capacitor according to an embodiment of the present disclosure. In detail, FIG. 3 is a view illustrating the LCG capacitor CAP of FIG. 2 according to the embodiment of the present disclosure.

Referring to FIGS. 2 to 3, the pixel PX may include the LCG capacitor CAP. The LCG capacitor CAP may have a form of a capacitor of a cell of a DRAM.

In order to accommodate a large amount of charges overflowing from the photodiode PD in the LCG mode, the LCG capacitor CAP may be provided in a cylindrical shape as illustrated. Capacitance of a capacitor is generally proportional to an effective surface area of the capacitor and a dielectric constant of a dielectric, and thus, the effective surface area of the capacitor may be increased by forming the LCG capacitor CAP in a cylindrical shape. Accordingly, a large capacitance of the capacitor may be formed. The LCG capacitor CAP may include at least one cylinder-shaped capacitor. A structure of the LCG capacitor CAP is not limited to the present disclosure and may be modified in various forms.

The LCG capacitor CAP may include an upper electrode TE, a lower electrode BE, and a dielectric layer DE. The upper electrode TE and the lower electrode BE of the LCG capacitor CAP may be formed in a cylinder shape, and the dielectric layer DE may be therebetween. The upper electrode TE and the lower electrode BE of the LCG capacitor CAP may be formed in a hollow circular cylinder shape and face each other having the dielectric layer DE interposed therebetween, and the dielectric layer DE may be formed in a conformal form along a surface of the lower electrode BE.

The upper electrode TE and the lower electrode BE may include polysilicon, metal, metal nitride, metal oxide, or a combination thereof. The dielectric layer DE may include nitride, oxide, metal oxide, or a combination thereof. For example, the dielectric layer DE may include a high-k material such as a hafnium oxide layer ($HfO_2$) or a zirconium oxide layer ($ZrO_2$) but is not limited thereto.

Figure 4:
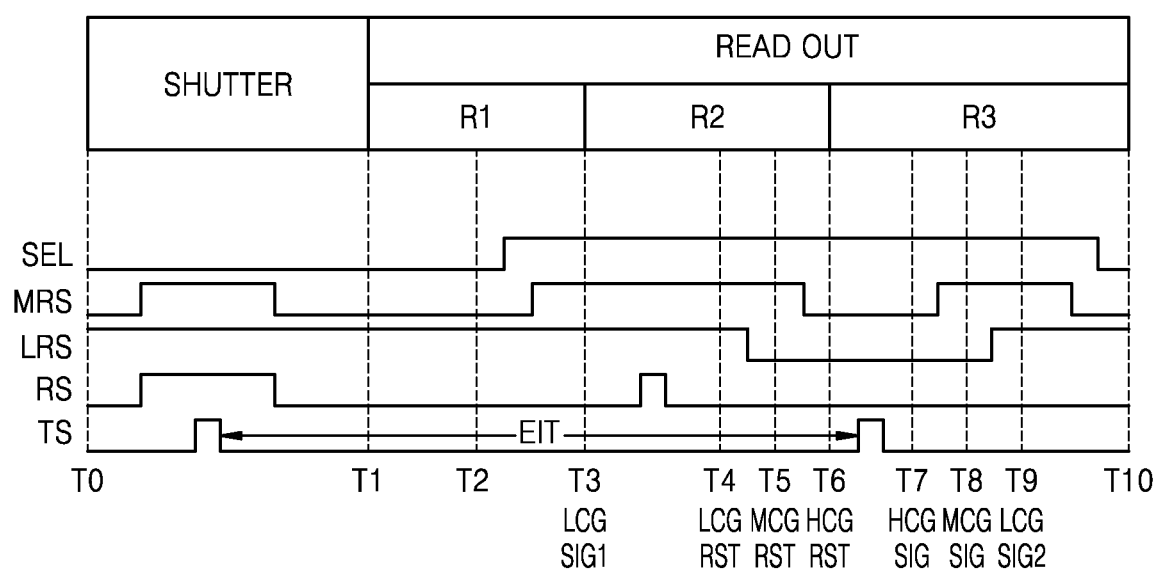
FIG. 4 is a timing diagram illustrating an operation of a pixel according to an embodiment of the present disclosure.

FIG. 4 illustrates an operation of a pixel according to an embodiment of the present disclosure. In detail, FIG. 4 is a timing diagram illustrating an operation of the pixel PX of FIG. 2 according to the embodiment of the present disclosure.

Referring to FIGS. 2 and 4, the pixel PX may reset the photodiode PD and the first floating diffusion node FD1 to the third floating diffusion node FD3 during a shutter period and read out pixel signals from the photodiode PD during a readout period. Hereinafter, operations performed during the shutter period and the readout period will be described.

First, during the shutter period, the MCG control signal MRS may be changed from a first level (for example, a logic low level) to a second level (for example, a logic high level), and the LCG control signal LRS may maintain the second level. Accordingly, the MCG transistor MRG and the LCG transistor LRG may be turned on, and the first floating diffusion node FD1 may be connected to the second floating diffusion node FD2, the third floating diffusion node FD3, and the LCG capacitor CAP.

The reset control signal RS and the transmission control signal TS may be changed from the first level to the second level after the MCG control signal MRS is changed from the first level to the second level. Accordingly, the reset transistor RG and the transmission transistor TG may be turned on, and the photodiode PD and the first floating diffusion node FD1 to the third floating diffusion node FD3 may be reset. That is, the photodiode PD and the first floating diffusion node FD1 to the third floating diffusion node FD3 may be connected to a pixel voltage terminal, and charges accumulated in the photodiode PD and the first floating diffusion node FD1 to the third floating diffusion node FD3 may be drained toward a pixel voltage VPIX to reset the photodiode PD and the first floating diffusion node FD1 to the third floating diffusion node FD3.

After the transmission control signal TS is changed from the second level to the first level, the reset control signal RS and the MCG control signal MRS may be changed from the second level to the first level. An operation in which the reset transistor RG is turned on by the reset control signal RS to reset the photodiode PD and the first floating diffusion node FD1 to the third floating diffusion node FD3 during the shutter period may be referred to as a "first turn-on operation", and an operation in which the reset transistor RG is turned on by the reset control signal RS to reset the first floating diffusion node FD1 to the third floating diffusion node FD3 and the LCG capacitor CAP may be referred to as a "second turn-on operation".

At a point in time T1, a readout period READOUT begins. The readout period READOUT may include a first readout period R1, a second readout period R2, and a third readout period R3.

During the first readout period R1, the LCG control signal LRS may maintain the second level, and the reset control signal RS and the transmission control signal TS may maintain the first level. Accordingly, during the first readout period R1, the LCG transistor LRG may be turned on, and the reset transistor RG and the transmission transistor TG may maintain a turn-off state. Accordingly, the first floating diffusion node FD1 may be connected to the third floating diffusion node FD3 and the LCG capacitor CAP.

A period from the point in time T1 to a point in time T2 may be omitted for the sake of convenience. That is, the period from the point in time T1 to the point in time T2 may be longer than the period illustrated in FIG. 4. After the point in time T2, the selection signal SEL and the MCG control signal MRS may be changed from the first level to the second level. Accordingly, the selection transistor SX and the MCG transistor MRG may be turned on. Accordingly, the first floating diffusion node FD1 may be connected to the second floating diffusion node FD2, the third floating diffusion node FD3, and the LCG capacitor CAP, and thus, the pixel PX may operate in the low conversion gain mode. The selection signal SEL may maintain the second level after being changed to the second level.

In this state, when a large amount of light is incident on the photodiode PD, photoelectric conversion may be performed in the photodiode PD. Charges generated by the photoelectric conversion may first be accumulated in the photodiode PD, and the charges accumulated in the photodiode PD from the point in time T2 may overflow across a gate potential barrier of the transmission transistor TG which is turned off. The overflowed charges may be transmitted to the first floating diffusion node FD1 to the third floating diffusion node FD3 and the LCG capacitor CAP to be accumulated therein. In other words, the overflow charges may indicate charges accumulated in the first floating diffusion node FD1 to the third floating diffusion node FD3 and the LCG capacitor CAP even in a state in which the transmission transistor TG is turned off, when more than certain charges are accumulated in the photodiode PD.

At a point in time T3, a first LCG image signal LCG SIG1 may be output. The first LCG image signal LCG SIG1 may indicate an image signal due to the overflowed charges. Accordingly, the first LCG image signal LCG SIG1 may be referred to as an "overflow image signal". The first LCG image signal LCG SIG1 may indicate a signal obtained by sampling a voltage corresponding to the amount of charges accumulated in the first floating diffusion node to the third floating diffusion node FD3 and the LCG capacitor CAP. By first outputting the first LCG image signal LCG SIG1 before the second readout period R2, an image signal corresponding to the amount of charges exceeding the amount of charges that may be accumulated in the photodiode PD may be output even when a large amount of light is incident on the photodiode PD to generate more charges than may be accumulated in the photodiode PD. Accordingly, image data with a wide dynamic range may be generated.

The second readout period R2 may start from the point in time T3. As the reset control signal RS is changed from the first level to the second level, the reset transistor RG may perform the second turn-on operation. The LCG transistor LRG may be turned on from when the reset transistor RG performs the first turn-on operation in response to the reset control signal RS to when the reset transistor RG performs the second turn-on operation. That is, the LCG control signal LRS may maintain the second level from when the reset control signal RS is changed to the second level during the shutter period to the second level during the readout period. During a period between the point in time T3 and a point in time T4, the MCG control signal MRS may maintain the second level. Accordingly, the charges accumulated in the first floating diffusion region FD1 to the third floating diffusion region FD3 and the LCG capacitor CAP may be drained to the pixel voltage terminal through the reset transistor RG. That is, the first floating diffusion regions FD1 to the third floating diffusion region FD3 may be reset to a level of the pixel voltage VPIX. After the first floating diffusion region FD1 to the third floating diffusion region FD3 are reset, the reset control signal RS may be changed from the second level to the first level. Accordingly, the reset transistor RG may be turned off again.

At the point in time T4, an LCG reset signal LCG RST may be output. The LCG reset signal LCG RST may be referred to as a "third reset signal". The MCG control signal MRS and the LCG control signal LRS maintain the second level at the point in time T4, the pixel PX may operate in the low conversion gain mode. Accordingly, the LCG reset signal LCG RST may indicate a reset signal in the low conversion gain mode. The point in time T4 may be a point in time when the first floating diffusion region FD1 to the third floating diffusion region FD3 maintain a stable reset state. As the selection control signal SEL maintains the second level, the selection transistor SX may be turned on, and thus, the LCG reset signal LCG RST may be output through the column line CL.

After the point in time T4, the LCG control signal LRS may be changed from the second level to the first level. Accordingly, the LCG transistor LCG is turned off, the third floating diffusion node FD3 and the LCG capacitor CAP may be electrically disconnected from the first floating diffusion node FD1 and the second floating diffusion node FD2. In addition, the third floating diffusion node FD3 and the LCG capacitor CAP may be blocked from the pixel voltage VPIX.

At a point in time T5, an MCG reset signal MCG RST may be output. The MCG reset signal MCG RST may be referred to as a "second reset signal". Because the MCG control signal MRS maintains the second level at the point in time T5 and the LCG control signal LRS is changed from the second level to the first level and maintains the first level, the pixel PX may operate in the middle conversion gain mode. Accordingly, the MCG reset signal MCG RST may indicate a reset signal in the middle conversion gain mode.

After the point in time T5, the MCG control signal MRS may be changed from the second level to the first level. Accordingly, the MCG transistor MCG is turned off, and thus, the second floating diffusion node FD2, the third floating diffusion node FD3, and the LCG capacitor CAP may be electrically disconnected from the first floating diffusion node FD1. In addition, the second floating diffusion node FD2, the third floating diffusion node FD3, and the LCG capacitor CAP may be blocked from the pixel voltage VPIX.

At a point in time T6, a high conversion gain (HCG) reset signal HCG RST may be output. The HCG reset signal HCG RST may be referred to as a "first reset signal". Because the MCG control signal MRS and the LCG control signal LRS are in the first level at a point in time T6, the pixel PX may operate in the high conversion gain mode. Accordingly, the HCG reset signal HCG RST may indicate a reset signal in the high conversion gain mode.

The third readout period R3 may start from a point in time T6. A period from when the transmission control signal TS is turned off during the shutter period to when the transmission control signal TS is turned on again during the third readout period R3 may be referred to as an effective integration time (EIT). The pixel PX may integrate photo-charges during the EIT. The photo-charges may be accumulated in the photodiode PD during the EIT.

After the second readout period R2, the transmission control signal TS may be changed from the first level to the second level. Accordingly, the transmission transistor TG may be turned on. During a period between the point in time T6 and a point in time T7, the transmission transistor TG is turned on, and the MCG control signal MRS and the LCG control signal LRS maintain the first level, and thus, charges accumulated in the photodiode PD may move to the first floating diffusion node FD1 to be accumulated therein. At this time, because the second floating diffusion region FD, the third floating diffusion region FD3, and the LCG capacitor CAP are electrically disconnected from the first floating diffusion region FD1, the charges accumulated in the photodiode PD may not move. Accordingly, the pixel PX may operate in the high conversion gain mode. Subsequently, the transmission control signal TS may be changed back from the second level to the first level. Accordingly, the transmission transistor TG may be turned off again.

At the point in time T7, the HCG image signal HCG SIG may be output. The HCG image signal HCG SIG may be referred to as a "first image signal". The HCG image signal HCG SIG may be an image signal in the high conversion gain mode. The HCG image signal HCG SIG may indicate a signal obtained by sampling a voltage corresponding to the amount of charges accumulated in the first floating diffusion region FD1.

After the point in time T7, the MCG control signal MRS may be changed from the first level to the second level. Because the MCG transistor MRG is turned on, the first floating diffusion node FD1 may be electrically connected to the second floating diffusion node FD2. Accordingly, the pixel PX may operate in the middle conversion gain mode.

At a point in time T8, an MCG image signal MCG SIG may be output. The MCG image signal MCG SIG may be referred to as a "second image signal". The MCG image signal MCG SIG may be an image signal in the middle conversion gain mode. That is, the MCG image signal MCG SIG may indicate a signal obtained by sampling a voltage corresponding to the amount of charges accumulated in the first floating diffusion node FD1 and the second floating diffusion node FD2.

After a point in time T8, the LCG control signal LRS may be changed from the first level to the second level. Because the MCG transistor MRG and the LCG transistor LRG are turned on, the first floating diffusion node FD1 may be electrically connected to the second floating diffusion node FD2, the third floating diffusion node FD3, and the LCG capacitor CAP. Accordingly, the pixel PX may operate in the low conversion gain mode.

At a point in time T9, a second LCG image signal LCG SIG2 may be output. The second LCG image signal LCG SIG2 may be referred to as a "third image signal". The second LCG image signal LCG SIG2 may be an image signal in the low conversion gain mode. That is, the second LCG image signal LCG SIG2 may indicate a signal obtained by sampling a voltage corresponding to the amount of charges accumulated in the first floating diffusion region FD1 to the third floating diffusion region FD3 and the LCG capacitor CAP. The second LCG image signal LCG SIG2 is limited to the amount of charges that may be accumulated in the photodiode PD, and thus, the second LCG image signal LCG SIG2 may be different from the first LCG image signal LCG SIG1 based on the overflowed charges.

After a point in time T10, the output pixel signals may be summed or synthesized. Description will be made in detail with reference to FIG. 6.

As described in the above timing diagram, the present disclosure may use the first floating diffusion node FD1 to the third floating diffusion node FD3 and the LCG capacitor CAP to output the LCG reset signal LCG RST, the first LCG image signal LCG SIG1 due to overflow changes, and the second LCG image signal LCG SIG2 charged in the photodiode PD by operating in the low conversion gain mode at high illuminance, and to output the MCG reset signal MCG RST and the MCG image signal MCG SIG by operating in the middle conversion gain mode at intermediate illuminance, and to output the HCG reset signal HCG RST and the HCG image signal HCG SIG by operating in the high conversion gain mode at low illuminance, and thus, a high dynamic range (HDR) may be efficiently obtained. In addition, an image sensor may generate image data with an increased signal-to-noise ratio.

FIGS. 5A to 5D illustrate potentials of a photodiode and floating diffusion nodes according to an embodiment of the present disclosure. In detail, FIGS. 5A to 5D structurally illustrate potentials of the photodiode PD, the first floating diffusion node FD1 to the third floating diffusion node FD3, and the LCG capacitor CAP in the pixel PX of FIG. 2. Vertical axes of FIGS. 5A to 5D represent indicators related to charge potentials. Hereinafter, description will be made with reference to FIGS. 2 and 4.

Figure 5A:
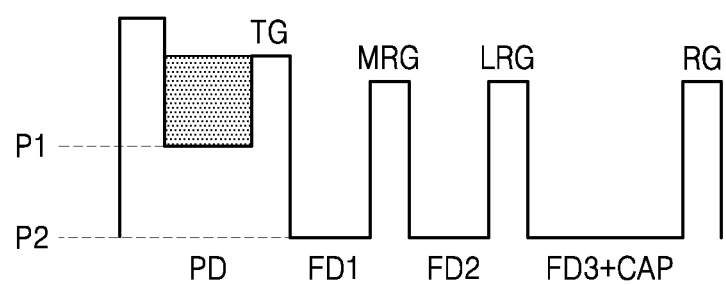
FIGS. 5A to 5D are hybrid diagrams illustrating potentials of floating diffusion nodes and a capacitor, according to an embodiment of the present disclosure.

Referring to FIG. 5A, a highest potential P1 of the photodiode PD may be higher than a potential P2 of the first floating diffusion node FD1. Accordingly, when a threshold voltage between the photodiode PD and the first floating diffusion node FD1 is reduced, charges accumulated in the photodiode PD may move to the first floating diffusion node FD1 due to a potential difference.

The potentials P2 of the first floating diffusion node FD1 to the third floating diffusion node FD3 are illustrated to be the same, but the present disclosure is not limited thereto, and the first floating diffusion node FD1 to the third floating diffusion node FD3 may also have potentials different from each other. For example, a potential of the first floating diffusion node FD1 may be higher than potentials of the second floating diffusion node FD2 or the third floating diffusion node FD3.

FIG. 5A may represent a potential at the point in time T6 of FIG. 4. At the point in time T6, charges may be accumulated in the photodiode PD. Because the transmission control signal TS is turned off, the charges may not move to the first floating diffusion node FD1.

Figure 5B:
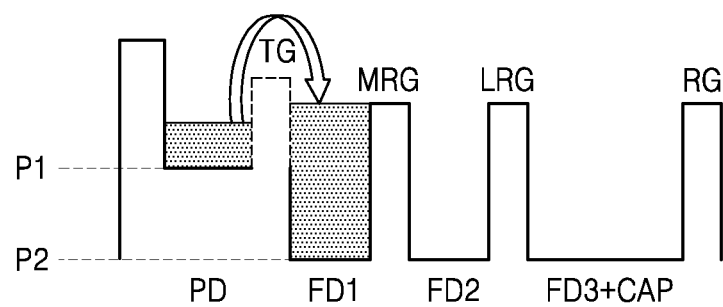

FIG. 5B may represent a potential at the point in time T7 of FIG. 4. Referring to FIG. 5B, the transmission transistor TG may be turned on according to the transmission control signal TS. Accordingly, a threshold voltage between the photodiode PD and the first floating diffusion node FD1 is reduced, and thus, the charges accumulated in the photodiode PD may move to the first floating diffusion node FD1. Because the MCG transistor MRG and the LCG transistor LRG are turned off according to the MCG control signal MRS and the LCG control signal LRS, the charges accumulated in the photodiode PD may not move to the second floating diffusion node FD2 and the third floating diffusion node FD3. Accordingly, the pixel PX may operate in the high conversion gain mode.

Figure 5C:
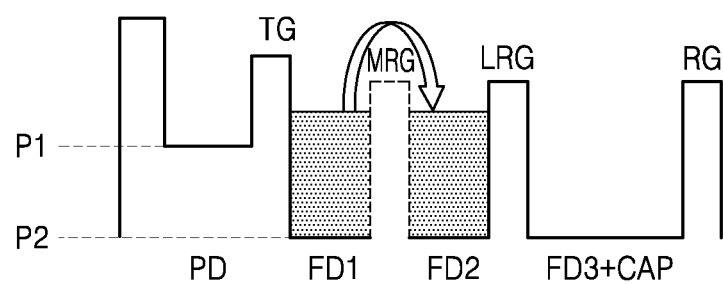

FIG. 5C may represent a potential at the point in time T8 of FIG. 4. Referring to FIG. 5C, the MCG transistor MRG may be turned on according to the MCG control signal MRS. Accordingly, a threshold voltage between the first floating diffusion node FD1 and the second floating diffusion node FD2 is reduced, and thus, charges accumulated in the first floating diffusion node FD1 may move to the second floating diffusion node FD2. Because the LCG transistor LRG is turned off according to the LCG control signal LRS, charges accumulated in the first floating diffusion node FD1 and the second floating diffusion node FD2 may not move to the third floating diffusion node FD3. Accordingly, the pixel PX may operate in the middle conversion gain mode.

Figure 5D:
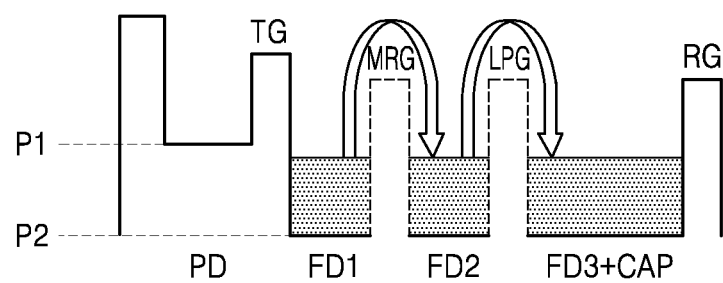

FIG. 5D may represent a potential at the point in time T9 of FIG. 4. Referring to FIG. 5D, the LCG transistor LRG may be turned on according to the LCG control signal LRS. Accordingly, a threshold voltage between the first floating diffusion node FD1 and the second floating diffusion node FD2 and the third floating diffusion node FD3 is reduced, and thus, charges accumulated in the first floating diffusion node FD1 and the second floating diffusion node FD2 may move to the third floating diffusion node FD3. Accordingly, the pixel PX may operate in the low conversion gain mode. The third floating diffusion node FD3 is connected to the LCG capacitor CAP, and thus, a charge storage capacity may be increased.

As described above, by controlling operations of the MCG transistor MRG and the LCG transistor LRG, charges generated by the photodiode PD may appropriately move to the first floating diffusion node FD1 to the third floating diffusion node FD3 and the LCG capacitor CAP.

Figure 6:
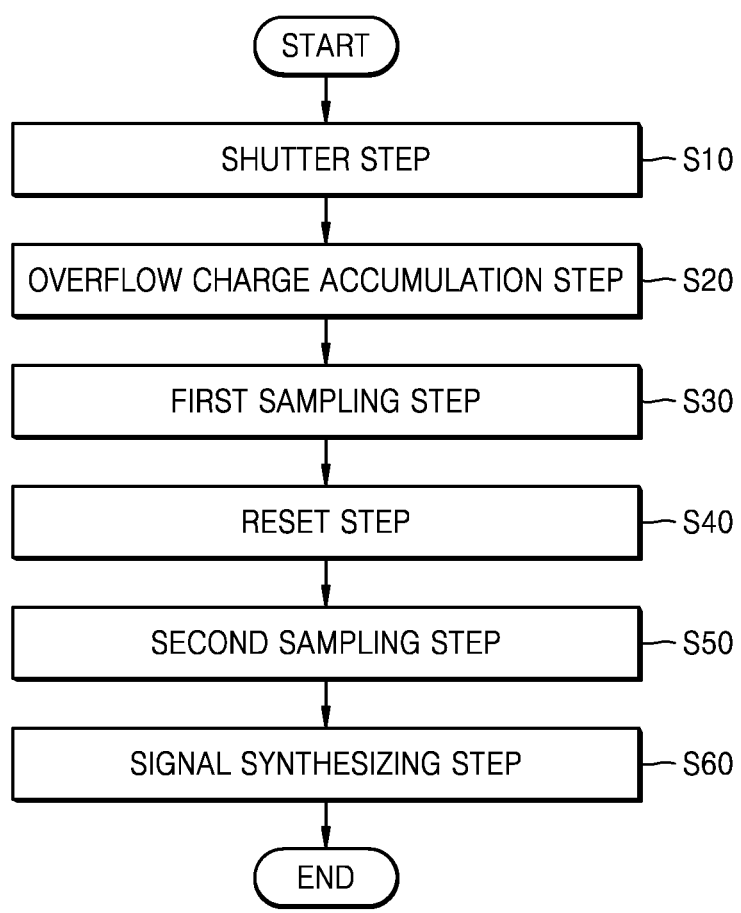
FIG. 6 is a flowchart illustrating an operation of an image sensor according to an embodiment of the present disclosure.

FIG. 6 illustrates an operating method of an image sensor according to an embodiment of the present disclosure. In detail, FIG. 6 is a flowchart illustrating an operating method of the image sensor 100, according to FIGS. 1 to 2. Hereinafter, description will be made with reference to FIGS. 1 to 2.

Referring to FIG. 6, in step S10, a shutter step may be performed. The image sensor 100 may turn on the MCG transistor MRG, the LCG transistor LRG, the reset transistor RG, and the transmission transistor TR in the pixel PX to reset the first floating diffusion node FD1 to the third floating diffusion node FD3 and the photodiode PD.

In step S20, an overflow charge accumulation step may be performed. When charges accumulated in the photodiode PD start to overflow from the photodiode PD, the overflowed charges may be accumulated in the first floating diffusion node FD1 to the third floating diffusion node FD3 and the LCG capacitor CAP. As the overflowed charges are integrated without loss in capacitance provided by the first floating diffusion node FD1 to the third floating diffusion node FD3 and the LCG capacitor CAP, potentials of the first floating diffusion node FD1 to the third floating diffusion node FD3 may be lower than the pixel voltage VPIX.

In step S30, a first sampling step may be performed. In the first sampling step, a first LCG image signal may be output. In step S30, both the LCG transistor LRG and the MCG transistor MRG are turned on to operate in a low conversion gain mode.

In step S40, a reset step may be performed. Voltages of the first floating diffusion node FD1 to the third floating diffusion node FD3 may be reset to a level of the pixel voltage VPIX. The reset step may operate in a triple conversion gain mode to output reset signals.

In step S50, a second sampling step may be performed. In the second sampling step, an HCG image signal, an MCG image signal, and a second LCG image signal may be output. In step S50, image signals may be output by operating in the triple conversion gain mode.

In step S60, a signal synthesis step may be performed. First, the first LCG overflow image signal based on the overflowed charges and the second LCG image signal based on the charges accumulated in the photodiode may be summed (SUM). The summed image signal may be referred to as a "synthesized LCG image signal".

Subsequently, HCG image data may be generated by using an HCG reset signal and the HCG image signal, which are pixel signals in the high conversion gain mode. The HCG image data may be referred to as "first image data".

MCG image data may be generated by using an MCG reset signal and the MCG image signal, which are pixel signals in the middle conversion gain mode. The MCG image data may be referred to as "second image data".

LCG image data may be generated by using an LCG reset signal and the synthesized LCG image signal, which are pixel signals in the low conversion gain mode. The LCG image data may be referred to as "third image data".

The first image data to the third image data may be synthesized. Final image data may be generated by synthesizing the first image data to the third image data. Synthesis of the first image data to the third image data may be performed by the signal processing unit 190 of FIG. 1.

As described above, the image sensor 100 according to the present disclosure provides a triple conversion gain mode according to illuminance, thereby efficiently implementing a high dynamic range (HDR) function. In addition, pixel signals and image data are generated for each illuminance in a single photographing and an image is provided by synthesizing the pixel signals and image data, and thus, motion artifacts may be removed. In addition, a plurality of image data are generated from one frame and synthesized into final image data, and thus, data generation time may be shortened compared to a case of synthesizing image data generated from a plurality of frames.

Figure 7A:
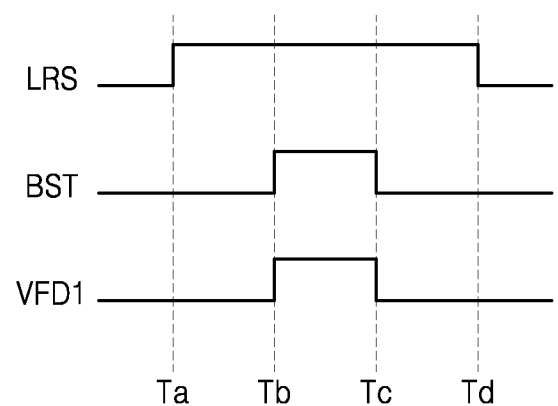
FIGS. 7A and 7B are timing diagrams illustrating a boosting operation according to an embodiment of the present disclosure.
Figure 7B:
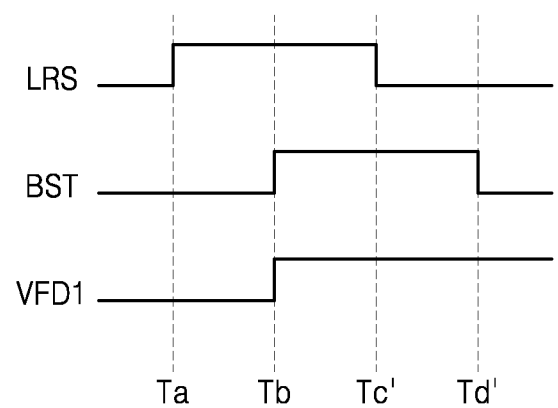

FIGS. 7A and 7B illustrate a boosting operation of a pixel according to an embodiment of the present disclosure. In detail, FIGS. 7A and 7B are timing diagrams illustrating a boosting operation of the pixel PX of FIG. 2 according to an embodiment of the present disclosure. Hereinafter, description will be made with reference to FIGS. 1 and 2.

Referring to FIG. 7A, at a point in time Ta, the LCG control signal LRS may be changed from a first level (for example, a logic low level) to a second level (for example, a logic high level). Accordingly, the LCG transistor LRG may be turned on, and the first floating diffusion node FD1 may be connected to the third floating diffusion node FD3 and the LCG capacitor CAP.

At a point in time Tb, the boosting signal BST having a boosting voltage may be applied to one end of the LCG capacitor CAP. The boosting signal BST may be one of the control signals transmitted from the row driver 120. In an embodiment, the boosting signal BST may have a ground voltage or a boosting voltage. The boosting voltage may be variable. For example, the boosting voltage may vary in a range between the ground voltage and a pixel voltage. The boosting voltage may exceed the ground voltage and may have a voltage equal to or less than the pixel voltage. In the present specification, "a boosting signal is applied" may indicate that a boosting signal having a boosting voltage is applied, and "a boosting signal is not applied" may indicate that a boosting signal having a ground voltage is applied. As the boosting signal BST is applied to one end of the LCG capacitor CAP, a voltage VFD1 of the first floating diffusion node FD1 may be boosted.

At a point in time Tc, the boosting signal BST may not be applied. Accordingly, the voltage VFD1 of the first floating diffusion node FD1 may be reduced.

At a point in time Td, the LCG control signal LRS may be changed from the second level to the first level. When the LCG control signal LRS is changed to the first level, the LCG capacitor CAP is electrically disconnected from the first floating diffusion node FD1, and thus, even when the boosting signal BST is applied to the LCG capacitor CAP, the voltage VFD1 of the first floating diffusion node FD1 may not be boosted.

Referring to FIG. 7B, the LCG control signal LRS may be changed from the second level to the first level at a point in time Tc', and the boosting signal BST may maintain the boosting voltage. Even when the LCG control signal LRS is changed to the first level and the LCG capacitor CAP is electrically disconnected from the first floating diffusion node FD1, the voltage VFD1 of the first floating diffusion node FD1 may remain boosted. That is, when the LCG control signal LRS is changed to the first level while the boosting signal BST is applied, the voltage VFD1 of the first floating diffusion node FD1 may remain boosted.

At a point in time Td', the boosting signal BST may have the ground voltage. Because the LCG control signal LRS is changed to the first level and the LCG capacitor CAP is electrically disconnected from the first floating diffusion node FD1, and thus, even when the boosting signal BST has the ground voltage, the voltage VFD1 of the first floating diffusion node FD1 may remain boosted.

As the boosting signal BST is applied to the LCG capacitor CAP, the voltage VFD1 of the first floating diffusion node FD1 may be boosted. Accordingly, a voltage difference between the voltage VFD1 of the first floating diffusion node FD1 and a voltage of the photodiode PD is increased, and thus, the high conversion gain mode may be implemented. In addition, a boosting effect may be obtained without a separate boosting circuit, and thus, space efficiency may be increased.

Figure 8:
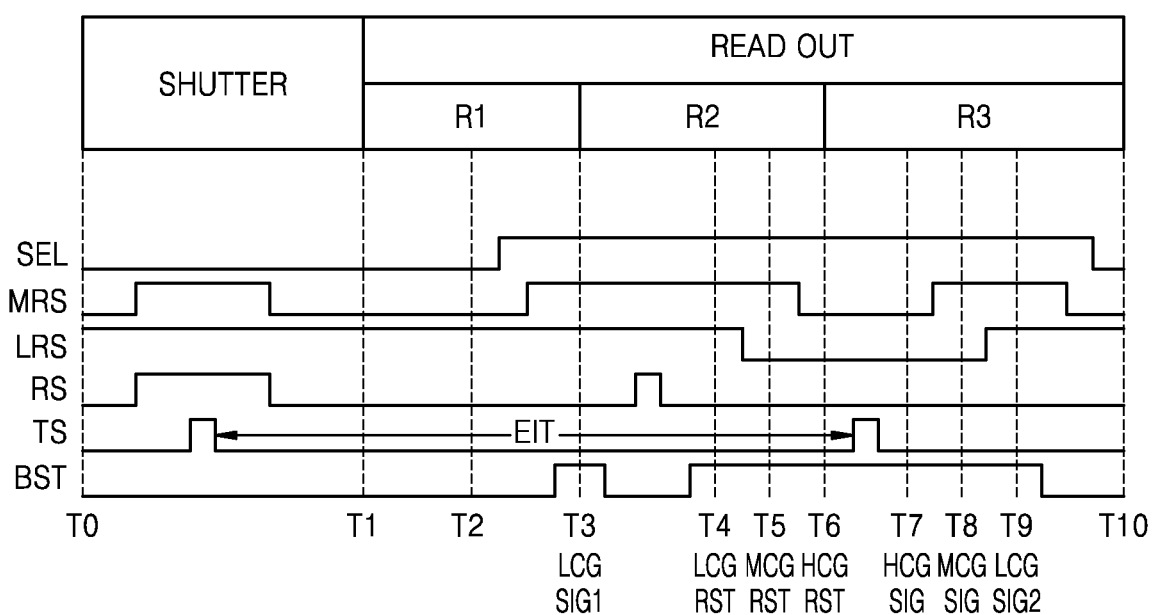
FIGS. 8 to 9 are timing diagrams illustrating an operation of a pixel according to an embodiment of the present disclosure.

FIG. 8 illustrates an operation of a pixel according to an embodiment of the present disclosure. In detail, FIG. 8 is a diagram illustrating a deformable embodiment of FIG. 4. Compared to the embodiment of FIG. 4, the embodiment of FIG. 8 may further perform a boosting operation. Descriptions already given with reference to FIG. 4 are omitted and description will be made with reference to FIGS. 2, 7A, and 7B.

Referring to FIG. 8, the boosting signal BST may be applied between a point in time T2 and a point in time T3. Because the LCG transistor LRG is turned on by the LCG control signal LRS at a point in time when the boosting signal BST is applied, a voltage of the first floating diffusion node FD1 may be boosted. After the point in time T3, the boosting signal BST may not be applied.

Subsequently, the boosting signal BST may be applied again between the point in time T3 and the point in time T4. Because the LCG transistor LRG is turned on by the LCG control signal LRS at a point in time when the boosting signal BST is applied, the voltage of the first floating diffusion node FD1 may be boosted.

During a period from the point in time T4 and a point in time T9, the LCG transistor LRG may be turned off by the LCG control signal LRS while the boosting signal BST is applied. As described in FIG. 7B, even when the LCG transistor LRG is turned off and the LCG capacitor CAP and the first floating diffusion node FD1 are electrically disconnected from each other, the voltage VFD1 of the first floating diffusion node FD1 may remain boosted.

Figure 9:
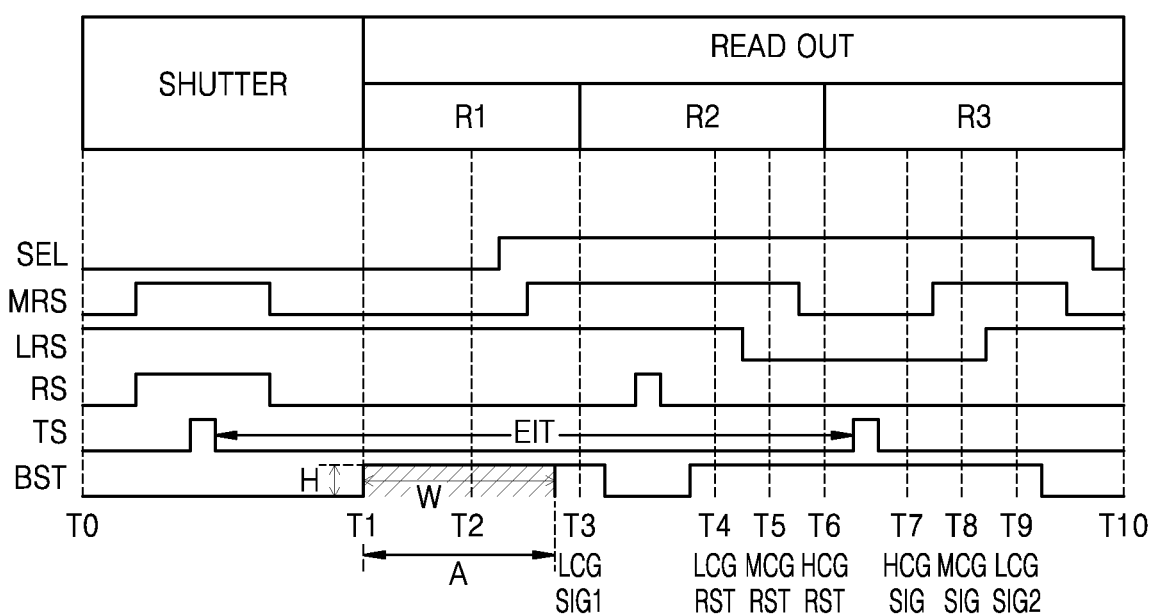

FIG. 9 illustrates an operation of a pixel according to an embodiment of the present disclosure. In detail, FIG. 9 illustrates a deformable embodiment of FIG. 8. Accordingly, descriptions already given with reference to FIGS. 4 and 8 are omitted, and description will be made with reference to FIGS. 2, 7A, and 7B.

Referring to FIG. 9, the boosting signal BST may be additionally applied during a period A compared to the embodiment of FIG. 8. The boosting signal BST additionally applied during the period A may be referred to as an "additional boosting signal".

A period W during which the additional boosting signal is applied may vary according to the EIT. For example, when the EIT is short, the period W during which the additional boosting signal is applied may be reduced.

A boosting voltage H of the additional boosting signal may vary according to an analog gain. The analog gain may determine a range of a voltage read out by the ADC circuit when the ADC circuit (131 of FIG. 1) receives a pixel signal output from the pixel PX. For example, as the analog gain increases, a voltage range of the pixel signal read out by the ADC circuit may be reduced. That is, as the analog gain is set to be larger, the pixel signal may be read out with a smaller voltage. Therefore, as the analog gain increases, a voltage required to implement the same image may be reduced. The analog gain may be set by a user. Accordingly, the boosting voltage H of the additional boosting signal may be reduced as the analog gain increases.

A voltage boosting effect of the first floating node FD1 may be efficiently obtained by varying the boosting signal BST additionally applied during the period A according to the EIT or the analog gain. In addition, when the analog gain increases, a boosting voltage of the boosting signal BST may be less variable, and thus, a leakage current may be prevented from being generated.

Figure 10:
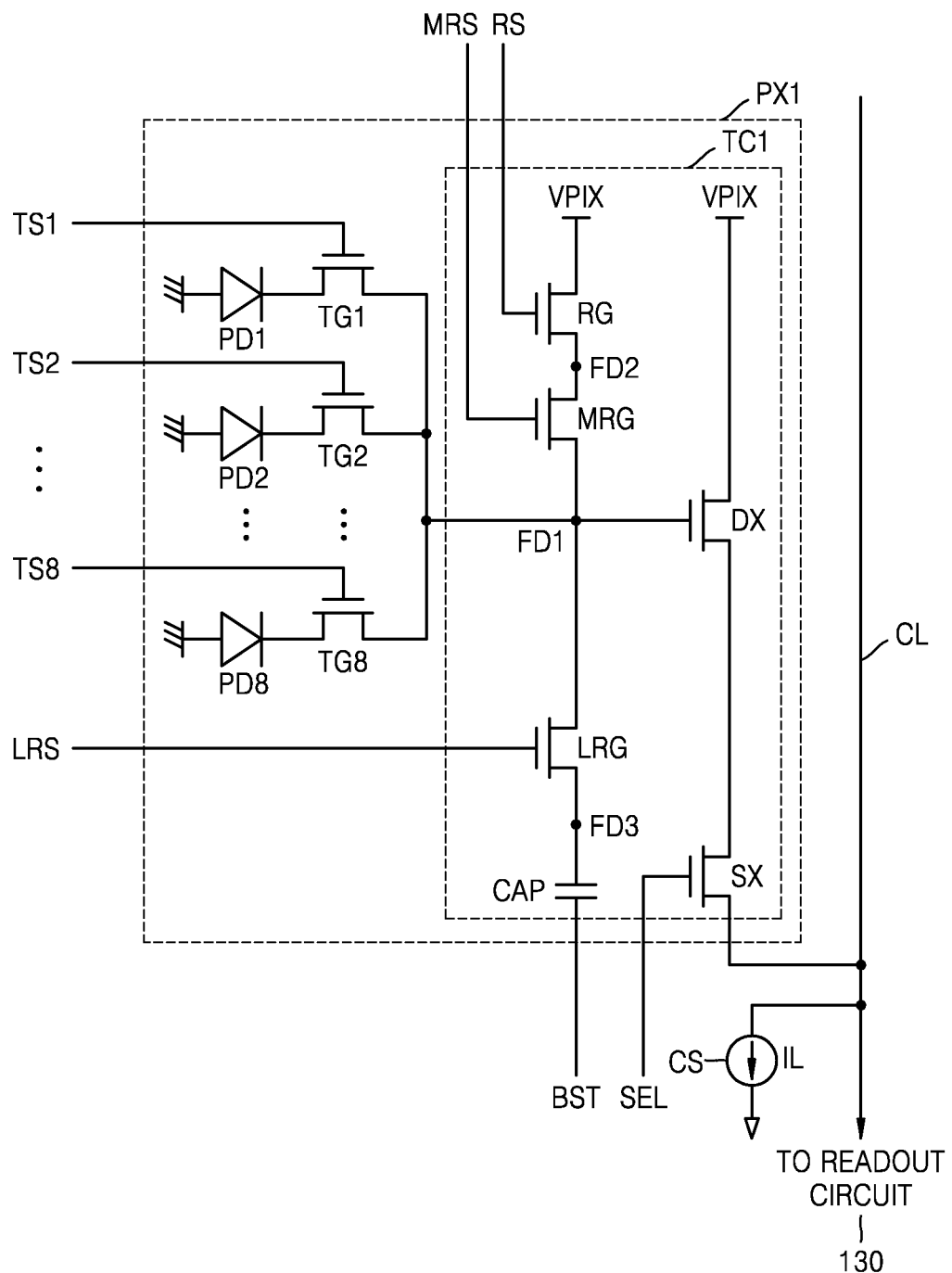
FIGS. 10 to 12 are circuit diagrams of a pixel according to an embodiment of the present disclosure.
Figure 11:
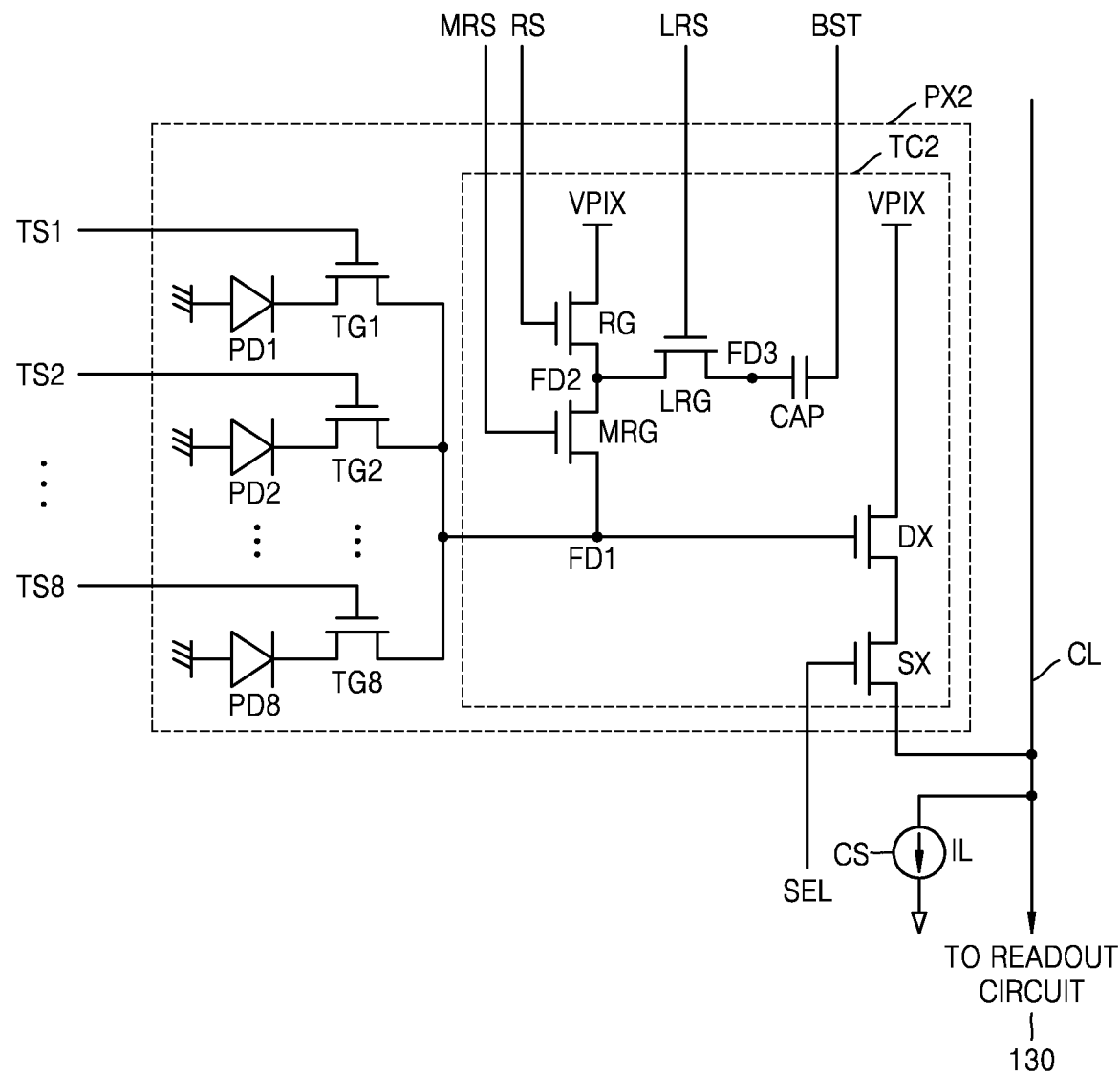
Figure 12:
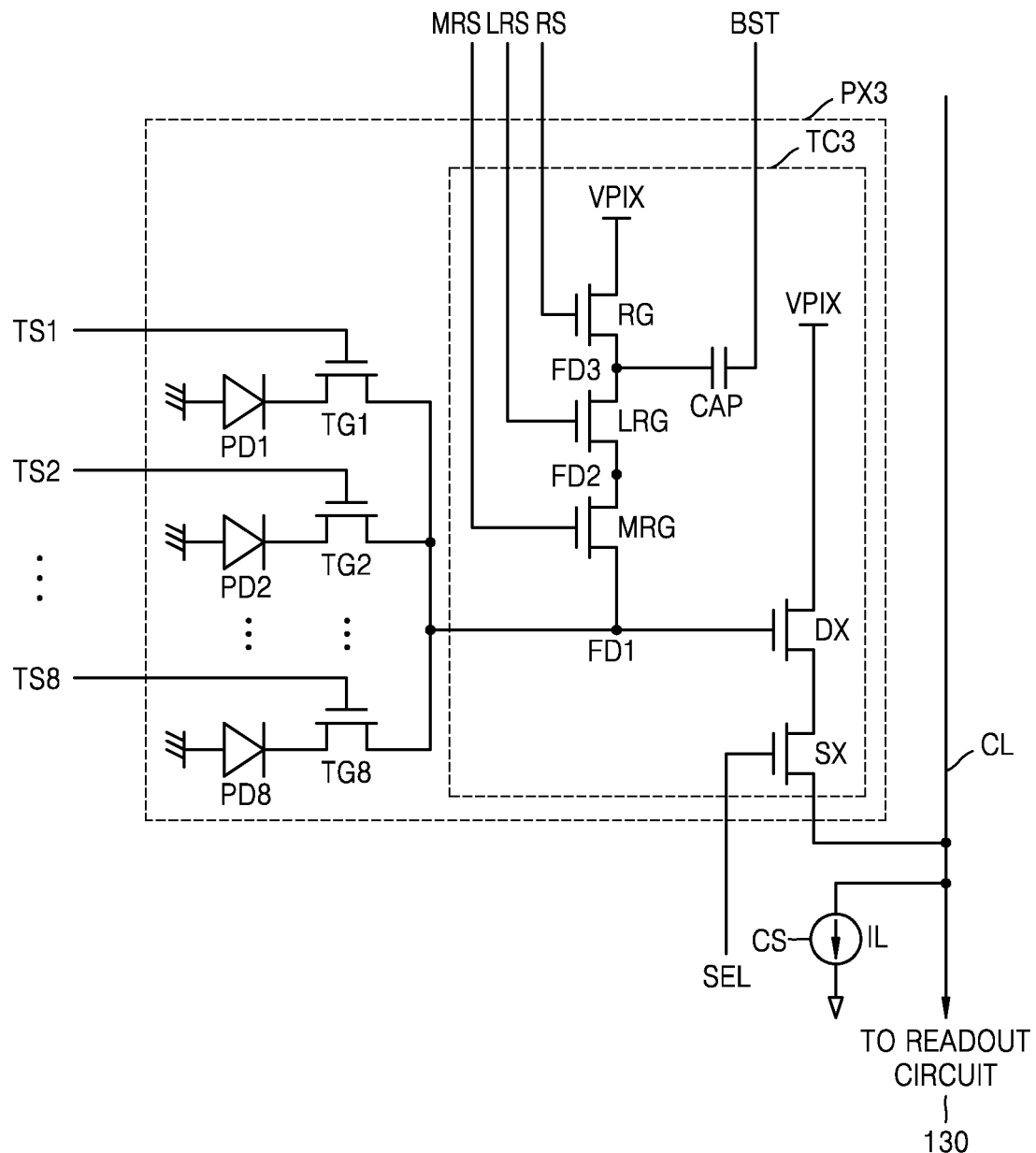

FIGS. 10 to 12 illustrate pixels according to embodiments of the present disclosure. In detail, FIGS. 10 to 12 are diagrams illustrating a deformable embodiment of FIG. 2. Voltages substantially applied to pixels PX1 to PX3 of FIGS. 10 to 12 may be the same as the voltage of FIG. 2.

Referring to FIG. 10, the pixel PX1 may include a plurality of photodiodes PD1 to PD8 and a plurality of transmission transistors TG1 to TG8.

The photodiodes PD1 to PD8 may correspond to the transmission transistors TG1 to TG8, respectively. Accordingly, one end of each of the transmission transistors TG1 to TG8 may be connected to any one of corresponding photodiodes PD1 to PD8, and the other end thereof may be connected to a first floating diffusion node FD1. Transmission signals TS1 to TS8 may be respectively applied to the transmission transistors TG1 to TG8. In the present embodiment, eight photodiodes PD1 to PD8 and eight transmission transistors TG1 to TG8 are illustrated, but the present disclosure is not limited thereto.

The pixel PX1 may include a transmission circuit TC1. The transmission circuit TC1 may include a first floating diffusion node FD1 to a third floating diffusion node FD3, an MCG transistor MRG, an LCG transistor LRG, an LCG capacitor CAP, a drive transistor DX, and a selection transistor SX. The transmission circuit TC1 may include the same components as the transmission circuit TC1 of FIG. 2. In the present embodiment, the plurality of photodiodes PD1 to PD8 may be arranged in one transmission circuit TC1, and thus, space efficiency may be increased. In addition, the photodiodes PD1 to PD8 having the same size may be arranged, and thus, manufacturing is performed and productivity may be increased.

FIGS. 10 to 12 may differ from each other in the transmission circuit TC1 to transmission circuit TC3. Substantially duplicate description may be omitted.

FIGS. 11 and 12 illustrate the plurality of photodiodes PD1 to PD8 and the plurality of transmission transistors TG1 to TG8, without limitation thereto. For example, at least one photodiode PD and at least one transmission transistor TG may be arranged as illustrated in FIG. 2. Accordingly, in describing FIGS. 11 and 12, descriptions on the same components as the components of FIG. 2 or 10 may be omitted, and the transmission circuits TC2 and TC3 may be described.

Referring to FIG. 11, in the transmission circuit TC2, an LCG transistor LRG may be connected to a second floating diffusion node FD2, and an MCG transistor MRG and the LCG transistor LRG may be connected to each other in parallel.

One end of the MCG transistor MRG may be connected to the first floating diffusion node FD1, and the other end thereof may be connected to the second floating diffusion node FD2. One end of a reset transistor RG may be connected to the second floating diffusion node FD2, and a pixel voltage VPIX may be applied to the other end thereof. One end of the LCG transistor LRG may be connected to the second floating diffusion node FD2, and the other end thereof may be connected to a third floating diffusion node FD3. An LCG capacitor CAP may be connected to the third floating diffusion node FD3.

Referring to FIG. 12, in a transmission circuit TC3, an LCG transistor LRG may be connected to a second floating diffusion node FD2, and an MCG transistor MRG and the LCG transistor LRG may be connected to each other in series.

One end of the MCG transistor MRG may be connected to a first floating diffusion node FD1, and the other end thereof may be connected to the second floating diffusion node FD2. One end of the LCG transistor LRG may be connected to the second floating diffusion node FD2, and the other end thereof may be connected to a third floating diffusion node FD3. One end of a reset transistor RG may be connected to the third floating diffusion node FD3, and a pixel voltage VPIX may be applied to the other end thereof. That is, the LCG transistor LRG may be between the MCG transistor MRG and the reset transistor RG. An LCG capacitor CAP may be connected to the third floating diffusion node FD3.

Figure 13:
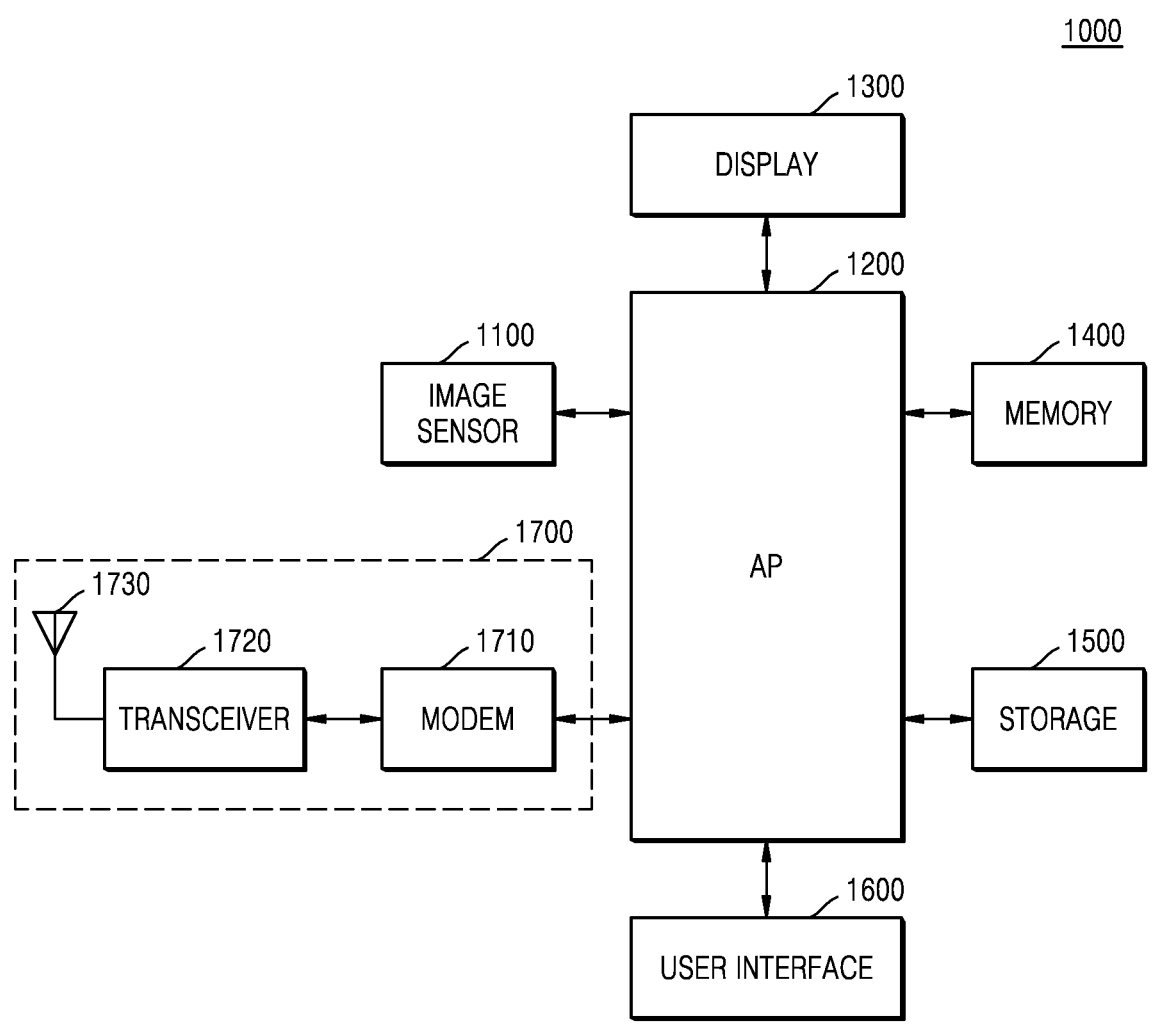
FIG. 13 is a block diagram illustrating an electronic device according to an embodiment of the present disclosure.

FIG. 13 illustrates an electronic device according to an embodiment of the present disclosure.

Referring to FIG. 13, an electronic device 1000 may include an image sensor 1100, an application processor 1200, a display 1300, a memory 1400, a storage 1500, a user interface 1600, and a wireless transmission/reception unit 1700. The image sensor 1100 of FIG. 13 may correspond to the image sensor 100 of FIG. 1. Descriptions already given with reference to FIG. 1 are omitted.

The application processor 1200 may control operations of the electronic device 1000 and may be provided as a system-on-chip (SoC) that drives an application program, an operating system, and so on. The application processor 1200 may receive image data from the image sensor 1100 and perform image processing on the received image data. In some embodiments, the application processor 1200 may store the received image data and/or the processed image data in the memory 1400 or the storage 1500.

The memory 1400 may store programs and/or data executed or processed by the application processor 1200. The storage 1500 may be implemented as a non-volatile memory device such as NAND flash or a resistive memory and for example, the storage 1500 may be provided as a memory card (a multi-media card (MMC), an embedded multimedia card (eMMC), a secure digital (SD) card, or a microSD card) or so on. The storage 1500 may store data and/or a program for an execution algorithm for controlling an image processing operation of the application processor 1200, and the data and/or program is loaded into the memory 1400 when the image processing operation is performed.

The user interface 1600 may be implemented with various devices capable of receiving a user input, such as a keyboard, a curtain key panel, a touch panel, a fingerprint sensor, and a microphone. The user interface 1600 may receive the user input and provide a signal corresponding to the received user input to the application processor 1200. The wireless transmission/reception unit 1700 may include a modem 1710, a transceiver 1720, and an antenna 1730.

Figure 14:
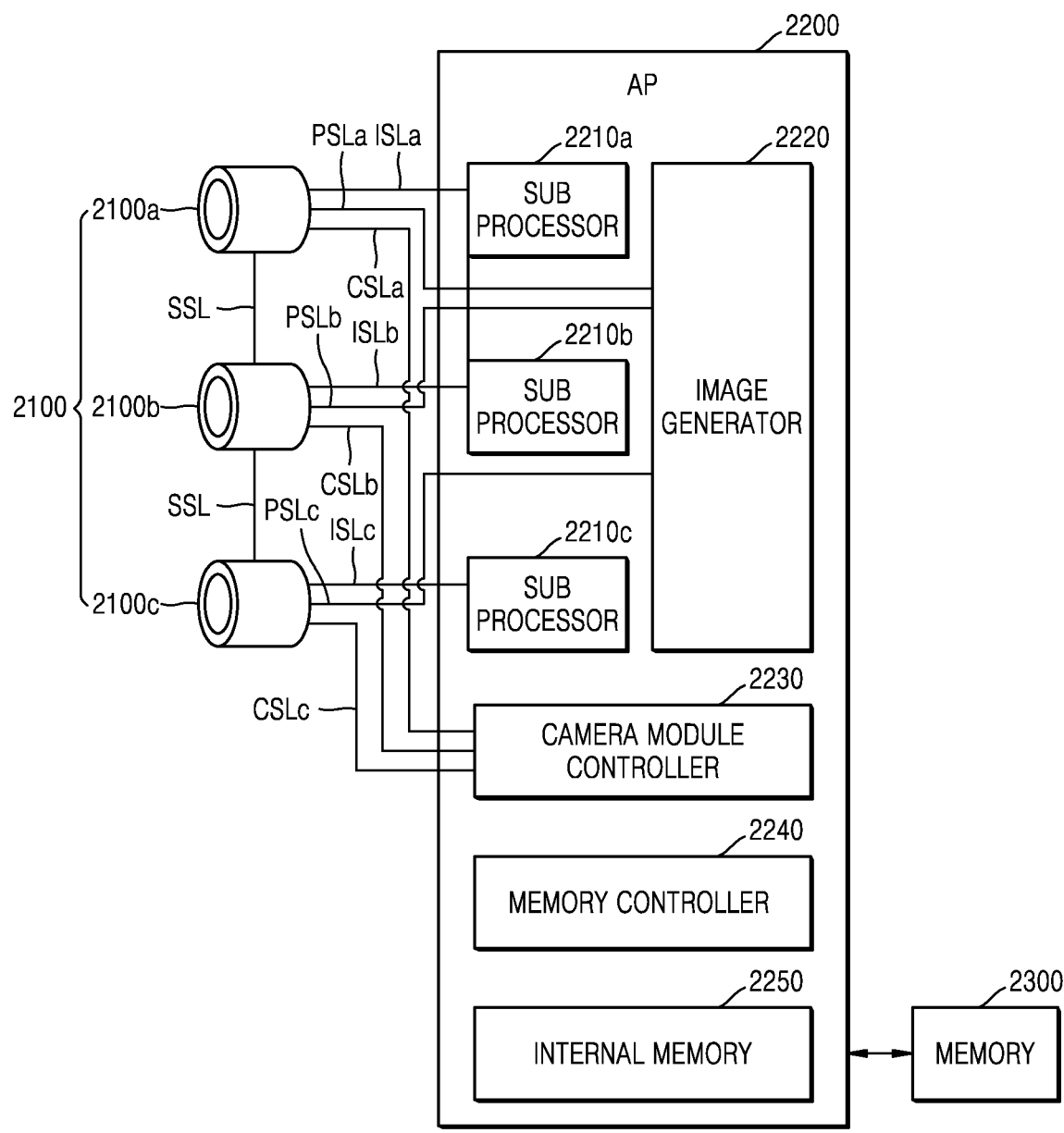
FIG. 14 is a block diagram illustrating part of an electronic device according to an embodiment of the present disclosure.
Figure 15:
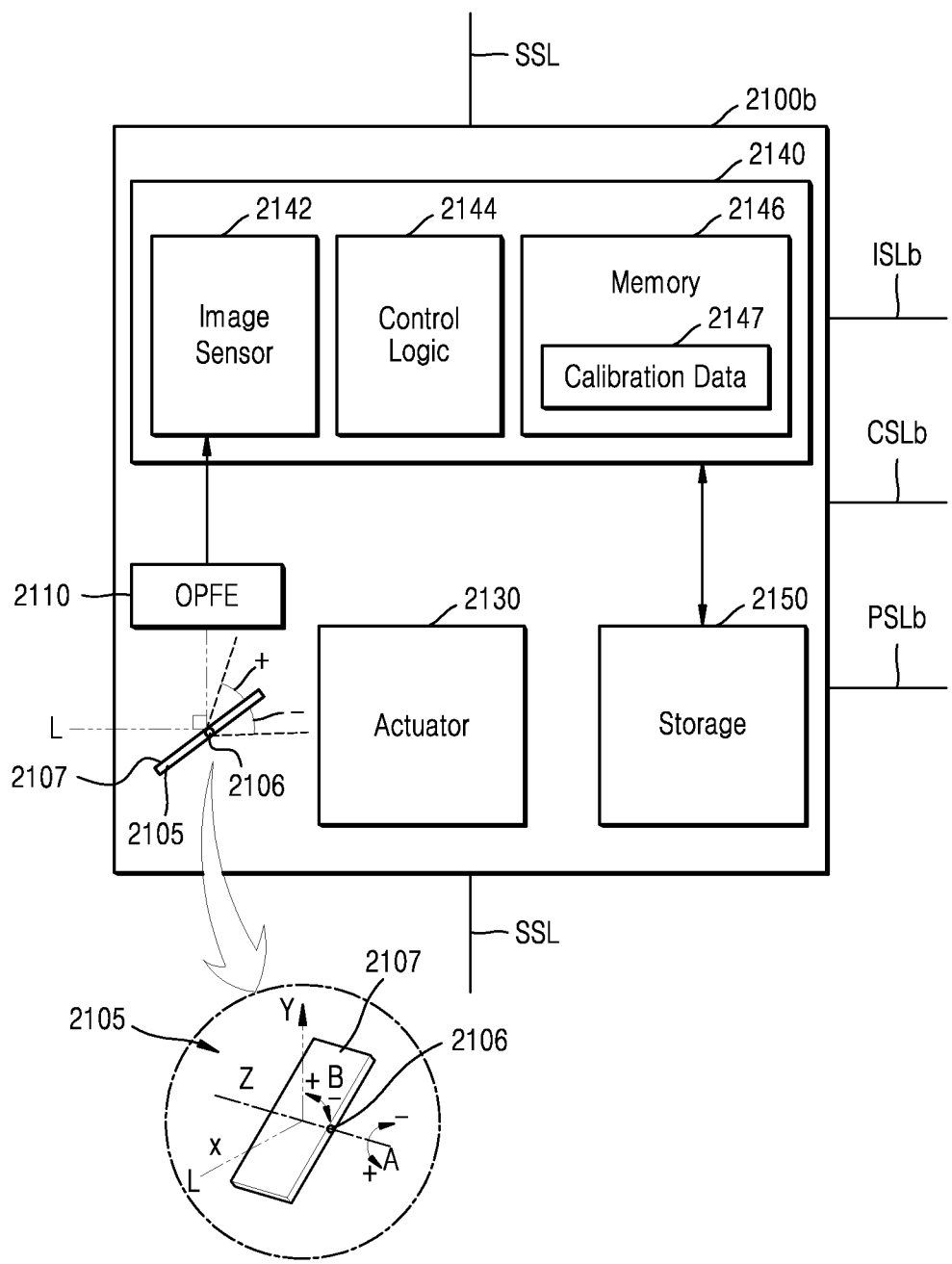
FIG. 15 is a block diagram illustrating a specific configuration of a camera module according to an embodiment of the present disclosure.

FIG. 14 illustrates part of the electronic device according to an embodiment of the present disclosure. FIG. 15 illustrates a detailed configuration of a camera module according to an embodiment of the present disclosure. FIG. 14 illustrates an electronic device 2000 as part of an electronic device 1000 of FIG. 13, and FIG. 15 illustrates a detailed configuration of a camera module 2100b of FIG. 14.

Referring to FIG. 14, the electronic device 2000 may include multi-camera module 2100, an application processor 2200, and a memory 2300. The memory 2300 may perform the same function as the memory 1400 illustrated in FIG. 13, and thus, redundant descriptions thereof are omitted.

The electronic device 2000 may capture an image of a subject by using a CMOS image sensor and/or store the captured image and may be implemented as a mobile phone, a tablet computer, or a portable electronic device. The portable electronic device may include a laptop computer, a mobile phone, a smartphone, a tablet PC, a wearable device, and so on.

The multi-camera module 2100 may include a first camera module 2100a, a second camera module 2100b, and a third camera module 2100c connected by a shutter signal line SSL. The multi-camera module 2100 may include the image sensor 100 of FIG. 1. In addition, although FIG. 14 illustrates that the multi-camera module 2100 includes three camera modules 1100a to 1100c, the present disclosure is not limited thereto, and two, four or more camera modules may be included in the multi-camera module 2100.

Hereinafter, a detailed configuration of the camera module 2100b will be described with reference to FIG. 15, but the following description may be equally applied to other camera modules 2100a and 2100c according to embodiments.

Referring to FIG. 15, the second camera module 2100b may include a prism 2105, an optical path folding element (hereinafter, referred to as an "OPFE") 2110, an actuator 2130, an image sensing device 2140, and a storage 2150.

The prism 2105 may include a reflective surface 2107 of a light reflective material to change a path of light L incident from the outside.

According to an embodiment, the prism 2105 may change the path of the light L incident in a first direction X to a second direction Y perpendicular to the first direction X. In addition, the prism 2105 may rotate the reflective surface 2107 of the light reflective material in an A direction about a central axis 2106 or rotate a central axis 2106 in a B direction to change the path of the light L incident in the first direction X in the second direction Y which is a vertical direction. In this case, the OPFE 2110 may move in a third direction Z perpendicular to the first direction X and the second direction Y.

In an embodiment, as illustrated in FIG. 15, the largest rotation angle of the prism 2105 in the A direction may be 15 degrees or less in a positive (+) A direction and may be greater than 15 degrees in a negative (−) A direction, but embodiments are not limited thereto.

In one embodiment, the prism 2105 is may move by about 20 degrees in a positive (+) B direction or a negative (−) B direction, or from about 10 degrees to about 20 degrees, or from about 15 degrees to about 20 degrees, and here, the prism 2105 may move at the same angle in the plus (+) B direction or the negative (−) B direction or may move at a nearly similar angle within a range of about 1 degree.

In one embodiment, the prism 2105 may move the reflective surface 2107 of the light reflective material in a third direction (for example, a Z direction) parallel to an extension direction of the central axis 2106.

The OPFE 2110 may include, for example, m (where m is a natural number) optical lenses. The m optical lenses may move in the second direction Y to change an optical zoom ratio of the camera module 2100b. For example, in a case where a basic optical zoom ratio of the camera module 2100b is referred to as Z, when the m optical lenses included in the OPFE 2110 are moved, the optical zoom ratio of the camera module 2100b may be changed to an optical zoom ratio of 3Z, 5Z, or 5Z or more.

The actuator 2130 may move the OPFE 2110 or an optical lens to a certain position. For example, the actuator 2130 may adjust the position of the optical lens such that the image sensor 2142 is located at a focal length of the optical lens for accurate sensing.

The image sensing device 2140 may include an image sensor 2142, a control logic 2144, and a memory 2146. The image sensor 2142 may detect an image of a sensing target by using light L provided through the optical lens. The image sensor 2142 of FIG. 15 may be functionally similar to the image sensor 110 of FIG. 1, and thus, redundant descriptions thereof may be omitted. The control logic 2144 may control the entire operation of the second camera module 2100b. For example, the control logic 2144 may control an operation of the second camera module 2100b according to a control signal provided through a control signal line CSLb.

The memory 2146 may store information for the operation of the second camera module 2100b, such as calibration data 2147. The calibration data 2147 may include information for the second camera module 2100b to generate image data by using the light L provided from the outside. The calibration data 2147 may include, for example, information on a degree of rotation, information on a focal length, information on an optical axis, and so on, which are described above. When the second camera module 2100b is implemented in a form of a multi-state camera of which focal length is changed according to a position of an optical lens, the calibration data 2147 may include focal length values for each position (or state) of the optical lens and information on auto focusing.

The storage 2150 may store image data detected by the image sensor 2142. The storage 2150 may be arranged outside the image sensing device 2140 and may be implemented as a stacked form with a sensor chip constituting the image sensing device 2140. In an embodiment, the storage 2150 may be implemented as an electrically erasable programmable read-only memory (EEPROM), but embodiments are not limited thereto.

Referring to FIGS. 14 and 15 together, in an embodiment, among the first camera module 2100a to the third camera module 2100c, one camera module (for example, the first camera module 2100a) may include four adjacent pixels (that is, tetra-cells) sharing the same color information in one color filter, and another camera module (for example, the second camera module 2100b) may include nine adjacent pixels (that is, nona-cells) sharing the same color information in one color filter, but embodiments are not limited thereto.

In an embodiment, each of the first camera module 2100a to the third camera module 2100c may include the actuator 2130. Accordingly, each of the first camera module 2100a to the third camera module 2100c may include the same or different calibration data 2147 according to an operation of the actuator 2130.

In an embodiment, among the first camera module 2100a to the third camera module 2100c, one camera module (for example, the second camera module 2100b) may be a folded lens type camera module including the prism 2105 and the OPFE 2110 described above, and the other camera modules (for example, the first camera module 2100a and the third camera module 2100c) may be vertical-type camera modules that do not include the prism 2105 and the OPFE 2110, but embodiments are not limited thereto.

In an embodiment, among the first camera module 2100a to the third camera module 2100c, one camera module (for example, the third camera module 2100c) may be a vertical-type depth camera that extracts depth information by using, for example, infrared ray (IR). In this case, the application processor 2200 may generate a three-dimensional (3D) depth image by merging image data provided from the depth camera with image data provided from another camera module (for example, the first camera module 2100a or the second camera module 2100b).

In an embodiment, among the first camera module 2100a to the third camera module 2100c, at least two camera modules (for example, the first camera module 2100a and the second camera module 2100b) may have fields of view (angles of view) different from each other. In this case, among the first camera module 2100a to the third camera module 2100c, for example, optical lenses of at least two camera modules (for example, the first camera module 2100a and the second camera module 2100b) may be different from each other, but the present disclosure is not limited thereto. For example, among the first camera module 2100a to the third camera module 2100c, the first camera module 2100a may have a smaller field of view (FOV) than the second camera modules 2100b and the third camera module 2100c. However, the present disclosure is not limited thereto, and the multi-camera module 2100 may further include a camera module having a larger FOV than the FOVs of the first camera module 2100a to the third camera module 2100c which are originally used.

In addition, in some embodiments, angles of view of the first camera module 2100a to the third camera module 2100c may be different from each other. In this case, optical lenses included in the first camera module 2100a to the third camera module 2100c may also be different from each other, but the present disclosure is not limited thereto.

In some embodiments, the first camera module 2100a to the third camera module 2100c may be arranged to be physically separated from each other. That is, the first camera module 2100a to the third camera module 2100c do not divide a sensing region of one image sensor 2142, and an independent image sensor 2142 may be arranged in each of the first camera module 2100a to the third camera module 2100c.

The application processor 2200 may include a first sub-processor 2210a, a second sub-processor 2210b, and a third sub-processor 2210c, a camera module controller 2230, a memory controller 2240, and an internal memory 2250. The application processor 2200 may be separated from the first camera module 2100a to the third camera module 2100c. For example, the application processor 2200 and the first camera module 2100a to the third camera module 2100c may be implemented as separate semiconductor chips. Pixel data generated by the first camera module 2100a may be provided to the image generator 2220 through a first pixel signal line PSLa, pixel data generated by the second camera module 2100b may be provided to the image generator 2220 through a second pixel signal line PSLb, and pixel data generated by the third camera module 2100c may be provided to the image generator 2220 through a third pixel signal line PSLc.

Image data or compressed data generated by the first camera module 2100a to the third camera module 2100c may be provided to the first sub-processor 2210a, the second sub-processor 2210b, and the third sub-processor 2210c through a first image signal line ISLa, a second image signal line ISLb, and a third image signal line ISLc separated from each other. For example, image data or compressed data generated by the first camera module 2100a may be provided to the first sub-processor 2210a through the first image signal line ISLa, and image data or compressed data generated by the second camera module 2100b may be provided to the second sub-processor 2210b through the second image signal line ISLb, and image data or compressed data generated by the third camera module 2100c may be provided to the third sub-processor 2210c through the third image signal line ISLc. Image data transmission may be performed by using, for example, a camera serial interface (CSI) based on a mobile industry processor interface (MIPI), but embodiments are not limited thereto.

In an embodiment, one sub-processor may be arranged to correspond to a plurality of camera modules. For example, the first sub-processor 2210a and the third sub-processor 2210c may be integrated into one sub-processor without being separated from each other as illustrated in FIG. 14, and the image data or the compressed data provided from the first camera module 2100a and the third camera module 2100c may be selected by a selection element (for example, a multiplexer) and then provided to the integrated sub-processor.

The camera module controller 2230 may provide control signals to the first camera module 2100a to the third camera module 2100c. The control signals generated by the camera module controller 2230 may be provided to the first camera module 2100a to the third camera module 2100c through control signal lines CSLa, CSLb, and CSLc separated from each other.

While the present disclosure has been particularly shown and described with reference to embodiments thereof, it will be understood by those of ordinary skill in the pertinent art that various changes in form and details may be made therein without departing from the spirit and scope of the present disclosure as set forth in the following claims.

What is claimed is:

1. An image sensor comprising:
a pixel array including a plurality of pixels; and
a row driver configured to provide the pixel array with a boosting signal,
wherein each of the plurality of pixels comprises:
a first photodiode;
a transmission transistor connected to the first photodiode;
a first floating diffusion node, a second floating diffusion node, and a third floating diffusion node, which are connected to the transmission transistor to accumulate charges generated by the first photodiode;
an LCG capacitor connected to the third floating diffusion node to accumulate the charges generated by the first photodiode;
an MCG transistor connected between the first floating diffusion node and the second floating diffusion node; and
an LCG transistor connected to the third floating diffusion node.

2. The image sensor of claim 1, wherein:
each of the plurality of pixels further comprises a reset transistor having one end connected to the second floating diffusion node and another end to which a pixel voltage is applied, and
the LCG transistor has one end connected to the third floating diffusion node and another end connected to the first floating diffusion node.

3. The image sensor of claim 1, wherein:
each of the plurality of pixels further comprises a reset transistor having one end connected to the second floating diffusion node and having another end to which a pixel voltage is applied, and the LCG transistor has one end connected to the third floating diffusion node and another end connected to the second floating diffusion node.

4. The image sensor of claim 1, wherein:
each of the plurality of pixels further comprises a reset transistor having one end connected to the third floating diffusion node and having another end to which a pixel voltage is applied, and
the LCG transistor has one end connected to the third floating diffusion node and another end connected to the second floating diffusion node.

5. The image sensor of claim 1, wherein:
the boosting signal has a ground voltage or a boosting voltage, and
the boosting voltage is variable in a range between a pixel voltage and the ground voltage.

6. The image sensor of claim 1, wherein:
each of the plurality of pixels further comprises a second photodiode and a second transmission transistor connected to the second photodiode,
the second transmission transistor is connected to the first floating diffusion node, and
the first to third floating diffusion nodes and the LCG capacitor accumulate charges generated by one selected from the first photodiode and the second photodiode.

7. The image sensor of claim 1, further comprising a read-out circuit configured to read out pixel signals output from pixels of a row line selected by the row driver, wherein:
each of the plurality of pixels further comprises a reset transistor for resetting the charges accumulated in the first photodiode, the first to third floating diffusion nodes, and the LCG capacitor,
the reset transistor performs a first turn-on operation to reset the first photodiode, the first to third floating diffusion nodes, and the LCG capacitor during a shutter period and performs a second turn-on operation to reset the first to third floating diffusion nodes and the LCG capacitor during a readout period, and
the LCG transistor is turned on from when the reset transistor performs the first turn-on operation to when the reset transistor performs the second turn-on operation.

8. The image sensor of claim 7, wherein before the reset transistor performs the second turn-on operation, each of the plurality of pixels outputs an image signal due to the charges accumulated in the first to third floating diffusion nodes and the LCG capacitor.

9. The image sensor of claim 1, wherein the LCG capacitor includes a dynamic random-access memory (DRAM) capacitor.

10. A pixel comprising:
photodiodes;
a first floating diffusion node configured to accumulate charges generated by any one of the photodiodes;
transmission transistors, each having one end connected to one of the photodiodes and having another end connected to the first floating diffusion node;
an MCG transistor connected to the first floating diffusion node;
a second floating diffusion node connected to the MCG transistor;
an LCG transistor connected to one of the first floating diffusion node and a second floating diffusion node;
a third floating diffusion node connected to the LCG transistor; and
a dynamic random-access memory (DRAM) capacitor having one end connected to the third floating diffusion node and having another end to which a boosting voltage is applied.

11. The pixel of claim 10, wherein the LCG transistor has one end connected to the first floating diffusion node and has another end connected to the third floating diffusion node.

12. The pixel of claim 10, wherein the LCG transistor has one end connected to the second floating diffusion node and has another end connected to the third floating diffusion node.

13. The pixel of claim 10, wherein:
the boosting signal has a ground voltage or a boosting voltage, and
the boosting voltage is variable in a range between a pixel voltage and the ground voltage.

14. The pixel of claim 10, wherein the DRAM capacitor has a cylindrical shape.

15. An operating method of an image sensor including a plurality of pixels that each includes a photodiode, a transmission transistor for transmitting charges generated by the photodiode, first to third floating diffusion nodes in which the charges generated by the photodiode are accumulated through the transmission transistor, and a dynamic random-access memory (DRAM) capacitor, the method comprising:
accumulating overflow charges generated by the photodiode in the first to third floating diffusion nodes and the DRAM capacitor in a state in which the transmission transistor is turned off;
outputting an overflow image signal corresponding to the overflow charges;
resetting the first to third floating diffusion nodes and the DRAM capacitor and outputting first to third reset signals respectively corresponding to a plurality of conversion gain modes; and
outputting first to third image signals respectively corresponding to the plurality of conversion gain modes, from the first to third floating diffusion nodes and the DRAM capacitor, after the transmission transistor is turned on.

16. The method of claim 15, wherein the outputting of the first to third image signals comprises:
outputting the first image signal corresponding to the charges accumulated in the first floating diffusion node;
outputting the second image signal corresponding to the charges accumulated in the first floating diffusion node and the second floating diffusion node; and
outputting the third image signal corresponding to the charges accumulated in the first to third floating diffusion nodes and the DRAM capacitor.

17. The method of claim 15, further comprising:
generating a synthesized LCG image signal by summing the overflow image signal and the third image signal.

18. The method of claim 17, further comprising:
generating first image data by using the first reset signal and the first image signal;
generating second image data by using the second reset signal and the second image signal;
generating third image data by using the third reset signal and the synthesized LCG image signal; and
synthesizing the first to third image data.

19. The method of claim 15, further comprising:
applying a boosting signal having one of a ground voltage and a boosting voltage to the DRAM capacitor,
wherein the boosting voltage is variable in a range between a pixel voltage and the ground voltage.

20. The method of claim 19, wherein the boosting voltage varies to have a smaller voltage as an analog gain is set to be larger.

\* \* \* \* \*